United States Patent
Goyal et al.

(10) Patent No.: US 11,582,638 B2
(45) Date of Patent: Feb. 14, 2023

(54) SELECTIVE RELAY OF DATA PACKETS

(71) Applicant: QUALCOMM Incorporated, San Diego, CA (US)

(72) Inventors: Giriraj Goyal, Bangalore (IN); Vishal Agarwal, Ramnagar (IN); Steven Singer, Cambridge (GB)

(73) Assignee: QUALCOMM INCORPORATED, San Diego, CA (US)

( * ) Notice: Subject to any disclaimer, the term of this patent is extended or adjusted under 35 U.S.C. 154(b) by 564 days.

(21) Appl. No.: 16/239,450

(22) Filed: Jan. 3, 2019

(65) Prior Publication Data
US 2020/0221336 A1 Jul. 9, 2020

(51) Int. Cl.
*H04W 28/04* (2009.01)
*H04W 12/033* (2021.01)
*H04W 84/18* (2009.01)

(52) U.S. Cl.
CPC ......... *H04W 28/04* (2013.01); *H04W 12/033* (2021.01); *H04W 84/18* (2013.01)

(58) Field of Classification Search
CPC combination set(s) only.
See application file for complete search history.

(56) References Cited

U.S. PATENT DOCUMENTS

| | | | |
|---|---|---|---|
| 6,526,022 B1* | 2/2003 | Chiu | H04L 47/15 370/252 |
| 2004/0174844 A1* | 9/2004 | Cho | H04L 12/1868 370/328 |
| 2009/0010268 A1* | 1/2009 | Giacomazzi | H04W 84/00 370/400 |
| 2009/0217119 A1* | 8/2009 | Zhang | H04L 1/1614 714/748 |
| 2010/0011273 A1* | 1/2010 | Parolari | H04L 1/1664 714/E11.113 |
| 2011/0055558 A1* | 3/2011 | Liu | H04L 9/0637 713/160 |
| 2011/0107168 A1* | 5/2011 | Jung | H04L 1/1614 714/748 |
| 2012/0069869 A1* | 3/2012 | Jeong | H04W 28/18 375/132 |
| 2012/0307769 A1* | 12/2012 | Fujita | H04W 72/042 370/329 |

(Continued)

FOREIGN PATENT DOCUMENTS

WO   2017150042 A1   9/2017

OTHER PUBLICATIONS

International Search Report and Written Opinion—PCT/US2019/067185—ISA/EPO—dated Mar. 30, 2020.

*Primary Examiner* — Cindy Trandai
(74) *Attorney, Agent, or Firm* — Muncy, Geissler, Olds & Lowe, P.C.

(57) ABSTRACT

The disclosure relates generally to wireless communication, and more particularly to selective relay of data packets. A method includes listening to a host device in one or more listening time slots of a host piconet, identifying one or more bitmap portions of a bitmap, wherein the identified one or more bitmap portions corresponds to the one or more listening time slots of the host piconet, determining whether a data packet having a data packet payload is effectively received from the host device during the one or more listening time slots, and populating the bitmap with one or more corresponding signifiers.

30 Claims, 13 Drawing Sheets

(56) References Cited

U.S. PATENT DOCUMENTS

| | | | | |
|---|---|---|---|---|
| 2013/0094481 | A1* | 4/2013 | Jeong | H04L 23/02 |
| | | | | 370/336 |
| 2014/0092839 | A1* | 4/2014 | Park | H04L 1/1861 |
| | | | | 370/329 |
| 2015/0172031 | A1* | 6/2015 | Yeo | H04W 74/04 |
| | | | | 370/329 |
| 2016/0365952 | A1* | 12/2016 | Kim | H04L 1/1845 |
| 2017/0230338 | A1* | 8/2017 | Loprieno | H04L 63/04 |
| 2017/0347340 | A1* | 11/2017 | Haley | H04L 27/2657 |
| 2018/0176911 | A1* | 6/2018 | Kim | H04W 4/00 |
| 2019/0056924 | A1* | 2/2019 | Jiang | G06F 8/65 |
| 2019/0097952 | A1* | 3/2019 | Yong | H04L 49/9057 |
| 2019/0124575 | A1* | 4/2019 | Long | H04L 1/18 |
| 2019/0173568 | A1* | 6/2019 | Jalali | H04B 7/18504 |
| 2019/0245655 | A1* | 8/2019 | Seo | H04L 1/1607 |
| 2020/0037152 | A1* | 1/2020 | Seok | H04W 12/037 |
| 2020/0106824 | A1* | 4/2020 | Erkin | H04L 65/70 |
| 2020/0113008 | A1* | 4/2020 | Luo | H04W 76/19 |
| 2020/0162878 | A1* | 5/2020 | Zhuang | H04W 4/06 |
| 2020/0196153 | A1* | 6/2020 | Agarwal | H04L 1/1845 |
| 2020/0196323 | A1* | 6/2020 | Church | H04W 4/80 |
| 2020/0348361 | A1* | 11/2020 | Kurts | H04L 9/0631 |
| 2020/0382982 | A1* | 12/2020 | Yao | H04L 1/189 |
| 2021/0410212 | A1* | 12/2021 | Parron | H04L 1/1896 |

\* cited by examiner

SELECTIVE RELAY OF DATA PACKETS

INTRODUCTION

Aspects of this disclosure relate generally to wireless communication, and more particularly to selective relay of data packets and the like.

Wireless devices increasingly communicate by using multiple networks simultaneously. Moreover, they may compete with other devices to access the communication medium. For example, a host device may use the communication medium to communicate with a first device in accordance with a first network (for example, a short-range network like Bluetooth) while simultaneously using the communication medium to communicate with other devices in accordance with a different network (for example, a mid-range network like WiFi). Meanwhile, the first device may also be communicating with a second device, which may itself be communicating on multiple networks.

When multiple devices simultaneously use the same communication medium, coexistence issues may arise. For example, the host device may transmit data packets, which may be received by the first device and the second device. If another device operating nearby causes interference with the communications of the host device, then the first device and/or the second device may miss a data packet. This may cause errors or excessive latency. For certain time-critical communications, such as those using classic Bluetooth Basic Rate/Enhanced Data Rate (BR/EDR) for operating in accordance with streaming audio protocols like Bluetooth's Advanced Audio Distribution Profile (A2DP), it is of special importance to limit errors and reduce latency. To achieve this, new techniques are needed.

SUMMARY

The following summary is an overview provided solely to aid in the description of various aspects of the disclosure and is provided solely for illustration of the aspects and not limitation thereof.

In accordance with aspects of the disclosure, a method is provided. The method comprises listening to a host device in one or more listening time slots of a host piconet, identifying one or more bitmap portions of a bitmap, wherein the identified one or more bitmap portions corresponds to the one or more listening time slots of the host piconet, determining whether a data packet having a data packet payload is effectively received from the host device during the one or more listening time slots, and populating the bitmap with one or more corresponding signifiers, wherein the populating comprises populating a first bitmap portion of the one or more bitmap portions with a reception signifier and any remaining bitmap portions of the one or more bitmap portions with a null signifier in response to a determination that the data packet having the data packet payload was effectively received during the one or more listening time slots, and populating each of the one or more values with the null signifier in response to a determination that the data packet having the data packet payload was not effectively received during the one or more listening time slots.

In accordance with other aspects of the disclosure, another method is provided. The another method comprises receiving one or more received data packets from a series of transmitted data packets that are transmitted from a host device over a host piconet during a plurality of listening time slots of the host piconet, receiving a bitmap over a primary/secondary piconet, wherein the bitmap includes a plurality of bitmap portions and each bitmap portion respectively corresponds to one of the plurality of listening time slots of the host piconet, analyzing the received bitmap to identify one or more missed data packets from the series of transmitted data packets that were not received from the host device, and generating a relay list of missed data packets based on the analyzing of the bitmap.

In accordance with yet other aspects of the disclosure, an apparatus is provided. The apparatus comprises a transceiver system, a memory system, and a processing system. The transceiver system is configured to listen to a host device in one or more listening time slots of a host piconet. The processing system is configured to identify one or more bitmap portions of a bitmap, wherein the identified one or more bitmap portions corresponds to the one or more listening time slots of the host piconet, determine whether a data packet having a data packet payload is effectively received from the host device during the one or more listening time slots, and populate the bitmap with one or more corresponding signifiers, wherein to populate the bitmap, the processing system is further configured to populate a first bitmap portion of the one or more bitmap portions with a reception signifier and any remaining bitmap portions of the one or more bitmap portions with a null signifier in response to a determination that the data packet having the data packet payload was effectively received during the one or more listening time slots, and populate each of the one or more values with the null signifier in response to a determination that the data packet having the data packet payload was not effectively received during the one or more listening time slots.

In accordance with yet other aspects of the disclosure, another apparatus is provided. The another apparatus comprises a transceiver system, a memory system, and a processing system. The transceiver system is configured to receive one or more received data packets from a series of transmitted data packets that are transmitted from a host device over a host piconet during a plurality of listening time slots of the host piconet, and receive a bitmap over a primary/secondary piconet, wherein the bitmap includes a plurality of bitmap portions and each bitmap portion respectively corresponds to one of the plurality of listening time slots of the host piconet. The processing system is configured to analyze the received bitmap to identify one or more missed data packets from the series of transmitted data packets that were not received from the host device, and generate a relay list of missed data packets based on the analyzing of the bitmap.

In accordance with yet other aspects of the disclosure, yet another apparatus is provided. The yet another apparatus comprises means for listening to a host device in one or more listening time slots of a host piconet, means for identifying one or more bitmap portions of a bitmap, wherein the identified one or more bitmap portions corresponds to the one or more listening time slots of the host piconet, means for determining whether a data packet having a data packet payload is effectively received from the host device during the one or more listening time slots, and means for populating the bitmap with one or more corresponding signifiers, wherein the means for populating comprises means for populating a first bitmap portion of the one or more bitmap portions with a reception signifier and any remaining bitmap portions of the one or more bitmap portions with a null signifier in response to a determination that the data packet having the data packet payload was effectively received during the one or more listening time slots, and means for populating each of the one or more values with the null signifier in response to a determination that the data packet having the data packet payload was not effectively received during the one or more listening time slots.

In accordance with yet other aspects of the disclosure, yet another apparatus is provided. The yet another apparatus comprises means for receiving one or more received data packets from a series of transmitted data packets that are transmitted from a host device over a host piconet during a plurality of listening time slots of the host piconet, means for receiving a bitmap over a primary/secondary piconet, wherein the bitmap includes a plurality of bitmap portions and each bitmap portion respectively corresponds to one of the plurality of listening time slots of the host piconet, means for analyzing the received bitmap to identify one or more missed data packets from the series of transmitted data packets that were not received from the host device, and means for generating a relay list of missed data packets based on the analyzing of the bitmap.

In accordance with yet other aspects of the disclosure, a non-transitory computer-readable medium comprising at least one instruction for causing a processor to perform operations is provided. The non-transitory computer-readable medium comprises code for listening to a host device in one or more listening time slots of a host piconet, code for identifying one or more bitmap portions of a bitmap, wherein the identified one or more bitmap portions corresponds to the one or more listening time slots of the host piconet, code for determining whether a data packet having a data packet payload is effectively received from the host device during the one or more listening time slots, and code for populating the bitmap with one or more corresponding signifiers, wherein the code for populating comprises code for populating a first bitmap portion of the one or more bitmap portions with a reception signifier and any remaining bitmap portions of the one or more bitmap portions with a null signifier in response to a determination that the data packet having the data packet payload was effectively received during the one or more listening time slots, and code for populating each of the one or more values with the null signifier in response to a determination that the data packet having the data packet payload was not effectively received during the one or more listening time slots.

In accordance with yet other aspects of the disclosure, another non-transitory computer-readable medium comprising at least one instruction for causing a processor to perform operations is provided. The another non-transitory computer-readable medium comprises code for receiving one or more received data packets from a series of transmitted data packets that are transmitted from a host device over a host piconet during a plurality of listening time slots of the host piconet, code for receiving a bitmap over a primary/secondary piconet, wherein the bitmap includes a plurality of bitmap portions and each bitmap portion respectively corresponds to one of the plurality of listening time slots of the host piconet, code for analyzing the received bitmap to identify one or more missed data packets from the series of transmitted data packets that were not received from the host device, and code for generating a relay list of missed data packets based on the analyzing of the bitmap.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
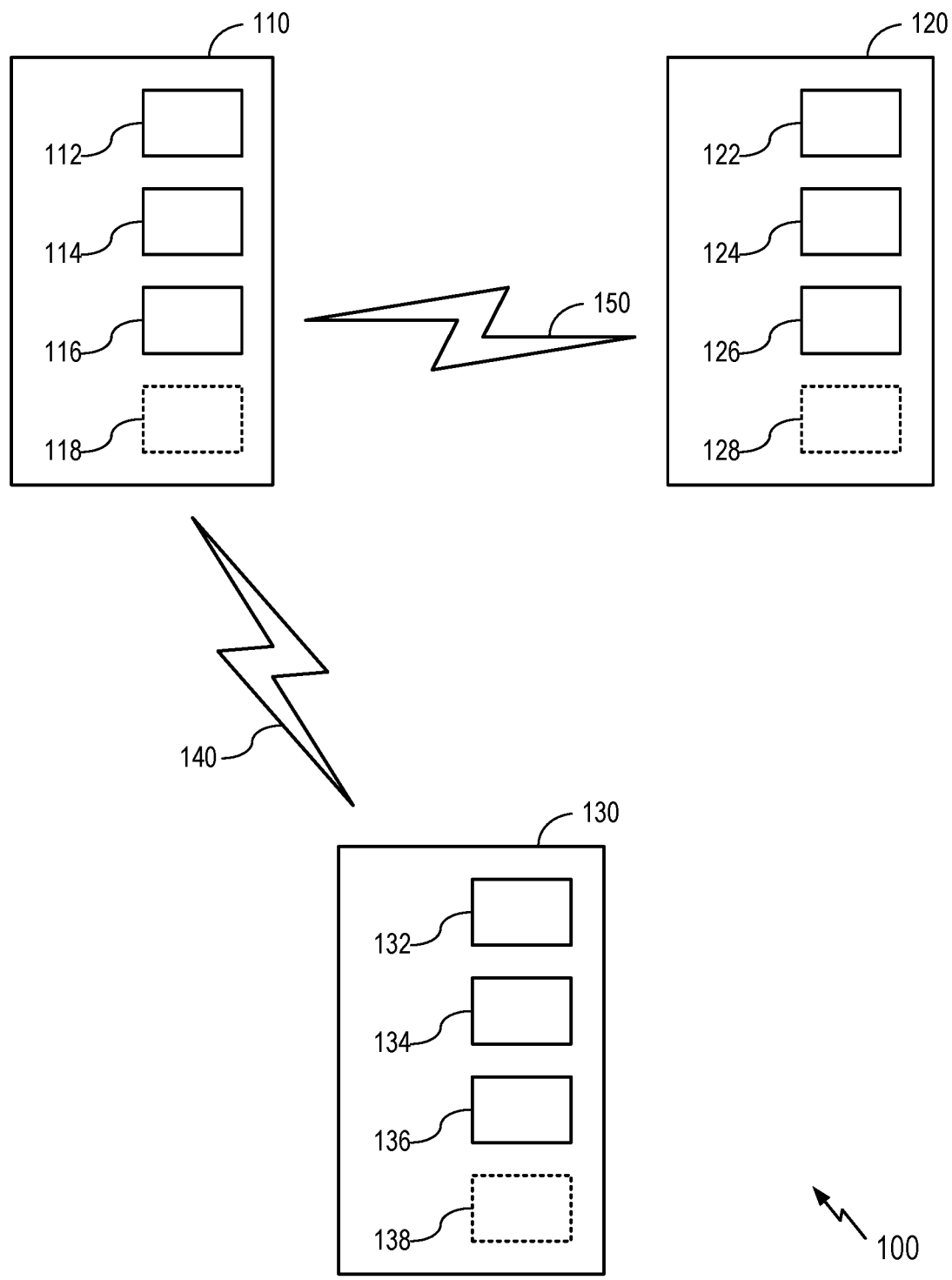
FIG. 1 generally illustrates a wireless environment that includes a primary device, a secondary device, and a host device in accordance with aspects of the disclosure.

FIG. 1 generally illustrates a wireless environment 100 that includes a primary device 110, a secondary device 120, and a host device 130. The primary device 110 and the host device 130 may establish a host piconet 140 to facilitate communication between the primary device 110 and the host device 130. The primary device 110 and the secondary device 120 may establish a primary/secondary (P/S) piconet 150 to facilitate communication between the primary device 110 and one or more other devices. In the present example, the one or more other devices include at least the secondary device 120.

The host device 130 may be obliged to coexist with other networks (not shown in FIG. 1). For example, the host device 130 may be required to observe a discontinuous transmission/reception scheme when communicating on the host piconet 140 in order to avoid undue interference with a nearby WiFi network. As a result, the primary device 110 may receive intermittent bursts of data packets from the host device 130. The bursts may arrive at unpredictable times, and may be punctuated by indefinite periods of reduced network activity.

The primary device 110 may have obligations of its own with respect to communications with the secondary device 120 over the P/S piconet 150. In some implementations, the host device 130 may provide data packets (associated with, for example, a streaming audio application) to both the primary device 110 and the secondary device 120. The secondary device 120 may not be configured to communicate directly with the host device 130, and may instead rely on the primary device 110 to selectively relay any data packets that are missed. To perform selective relay, it may be necessary for the primary device 110 and/or the secondary device 120 to identify the packets that are missed by the secondary device 120 and then coordinate to facilitate selective relay of the missed data packets from the primary device 110 to the secondary device 120.

As will be discussed in greater detail below with reference to FIG. 2, the host device 130 may be configured to transmit data packets using alternating time slots of a Time-Division Duplexed (TDD) communication scheme associated with the host piconet 140. In accordance with aspects of the disclosure, the primary device 110 and the secondary device 120 are configured to follow certain rules such that the overall efficiency of the system is improved.

The primary device 110 may include a transceiver system 112, a memory system 114, a processing system 116, and optional other components 118. The transceiver system 112 may be configured to transmit and/or receive signals over the host piconet 140, the P/S piconet 150, and/or any other medium. The transceiver system 112 may be configured to operate in accordance with a Bluetooth protocol, a wireless land area network (WLAN) protocol, a wireless wide area network (WWAN) protocol, and/or any other suitable protocol. As an example, the transceiver system 112 may be configured to transmit and/or receive streaming audio data. The streaming audio data may be transmitted asynchronously using, for example, Bluetooth Basic Rate/Enhanced Data Rate (BR/EDR) protocol.

The memory system 114 may be configured to store data, instructions, or a combination thereof. The memory system 114 may comprise Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of non-transitory storage medium. As used herein the term "non-transitory" does not exclude any physical storage medium or memory and particularly does not exclude dynamic memory (e.g., RAM) but rather excludes only the interpretation that the medium can be construed as a transitory propagating signal.

The processing system 116 may be coupled to the transceiver system 112, the memory system 114, and the other components 118. The processing system 116 may be configured to perform operations in accordance with the instructions stored in the memory system 114. The processing system 116 may be configured to transmit commands to the other components of the primary device 110. The commands may be transceiver commands associated with tuning to a particular frequency, transmitting and receiving in accordance with a particular timing, or transferring data to or from the transceiver system 112. Additionally or alternatively, the commands may be memory commands associated with storing and/or retrieving data and/or instructions.

The other components 118 may include one or more user inputs, one or more user output, a battery, and/or any other suitable components. In accordance with aspects of the disclosure, the other components 118 may include a speaker configured to transmit an audio signal. In particular, the speaker may be configured to receive an electronic signal from within the primary device 110 and convert the electronic signal into an audio signal.

The secondary device 120 may include a transceiver system 122, a memory system 124, a processing system 126, and optional other components 128. The transceiver system 122, the memory system 124, the processing system 126, and the other components 128 may be analogous to the transceiver system 112, the memory system 114, the processing system 116, and the other components 118 included in the primary device 110. For brevity, further description of these components will be omitted.

In some implementations, the primary device 110 and the secondary device 120 may collectively be provided as wireless earbuds. For example, the wireless earbuds may be configured to play, into the ears of a listener, stereo sound comprising left and right audio streams. The primary device 110 may transmit the left audio stream while the secondary device 120 transmits the right audio stream, or vice-versa.

The host device 130 may include a transceiver system 132, a memory system 134, a processing system 136, and optional other components 138. The transceiver system 132, the memory system 134, the processing system 136, and the other components 138 may be analogous to the transceiver system 112, the memory system 114, the processing system 116, and the other components 118 included in the primary device 110. For brevity, further description of these components will be omitted. The host device 130 may comprise a set top box, a music player, a video player, an entertainment unit, a navigation device, a personal digital assistant (PDA), a fixed location data unit, a computer, a laptop, a tablet, a communications device, a mobile phone, or any other suitable device.

In accordance with aspects of the disclosure, the host device 130 may transmit audio data to the primary device 110 via the host piconet 140. Control data relating to the host piconet 140 may be shared with the secondary device 120, which may eavesdrop on communications (sometimes referred to as "sniffing") between the host device 130 and the primary device 110. In this manner, host data (for example, streaming stereo audio data) may be transmitted by the host device 130 to both the primary device 110 and the secondary device 120.

However, certain conditions in the wireless environment 100 can prevent consistent transmission and/or reception of the data. Accordingly, new techniques are required for improving transmission of host data in a wireless environment analogous to the wireless environment 100. FIG. 2 generally illustrates a method 200 for the host device 130 depicted in FIG. 1 to transmit a series of data packets to the primary device 110 in accordance with aspects of the disclosure.

At 210, the host device 130 selects a first data packet of the series of data packets for transmission. The data packet selected at 210 may have a sequence number (SEQN) of zero. At 220, the host device 130 transmits the data packet to the primary device 110 over the host piconet 140. As noted above, if control data relating to the host piconet 140 is shared with the secondary device 120, the secondary device 120 may listen for the data packets transmitted at 220. At 230, the host device 130 determines whether an acknowledgement (ACK) has been received from the primary device 110. If no ACK has been received ('no' at 230), then the method 200 returns to 220, where it transmits (or re-transmits as the case may be) the data packet selected at 210 (having SEQN=0). If the ACK has been received ('yes' at 230), then the method 200 proceeds to 240.

At 240, the host device 130 selects a second data packet of the series of data packets for transmission. By contrast to the data packet selected at 210, the data packet selected at 240 may have a sequence number (SEQN) of one. At 250, the host device 130 transmits the data packet selected at 240 to the primary device 110 over the host piconet 140. At 250, the host device 130 determines whether an acknowledgement (ACK) has been received from the primary device 110. If no ACK has been received ('no' at 260), then the method 200 returns to 250, where it transmits (or re-transmits as the case may be) the data packet selected at 210 (having SEQN=1). If the ACK has been received ('yes' at 260), then the method 200 returns to 210.

Figure 2:
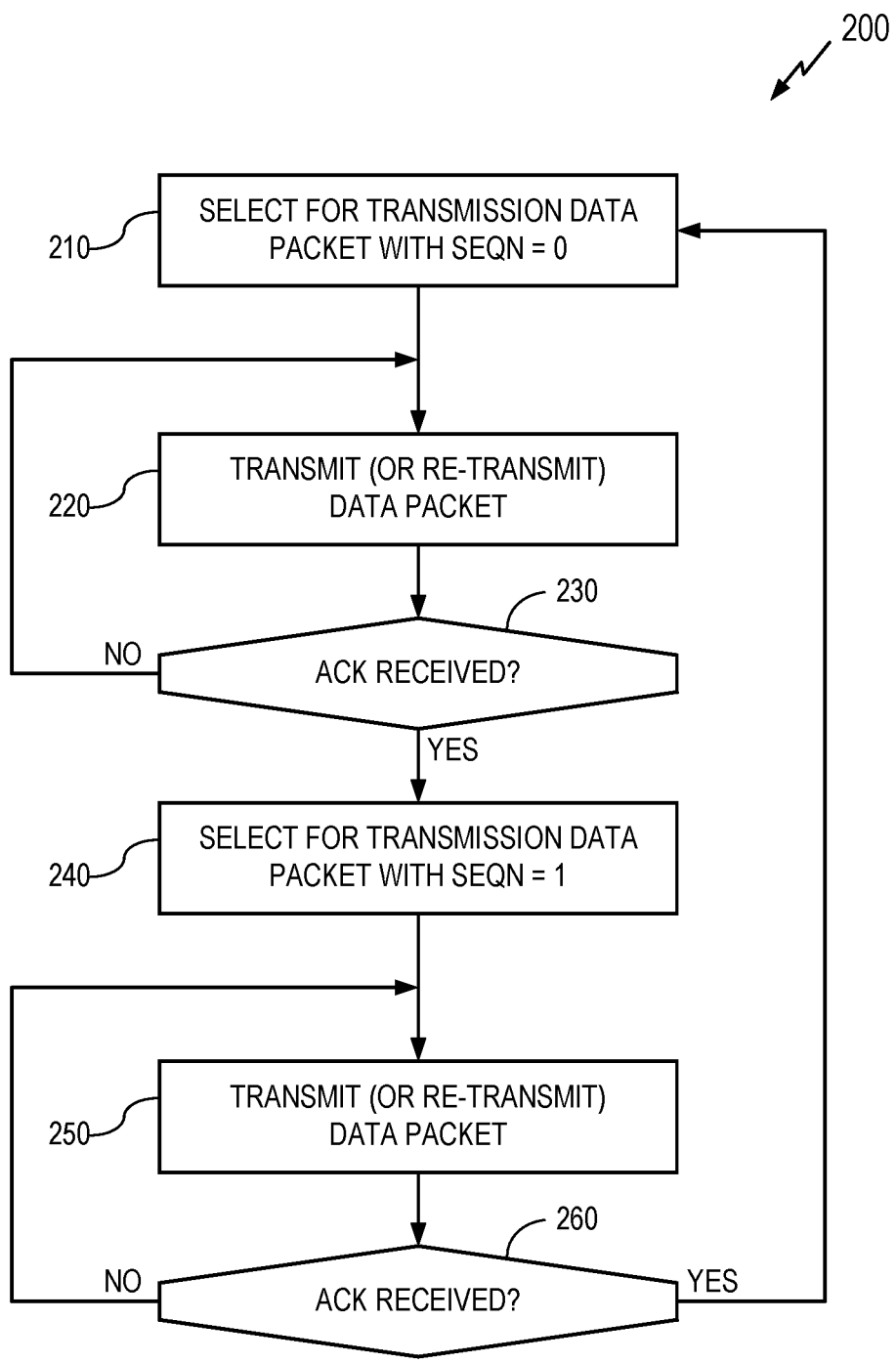
FIG. 2 generally illustrates a method for the host device depicted in FIG. 1 to transmit a series of data packets to the primary device in accordance with aspects of the disclosure.

As will be understood from FIG. 2, the method 200 may be reiterated until every data packet in the series of data packets (for example, a third data packet, a fourth data packet, etc.) has been transmitted to the primary device 110, and an ACK has been received from the primary device 110 for each data packet. Moreover, each data packet will have a SEQN that is different from the last data packet and different from the next data packet. Two different data packets having, for example, a SEQN=0 will be separated in time from one another by yet another data packet with a SEQN=1.

The transmitting of a particular data packet may occur in a particular time slot group associated with the host piconet 140. The particular time slot group may include one, three, or five slots, and may be a predefined segment of a time-division duplexing (TDD) scheme. The TDD scheme may be the framework for communicating over the host piconet 140. The host piconet 140 may have a master and at least one slave. The master may be arbitrarily selected. The master transmits for the duration of a particular slot group while the slave receives. The roles may then reverse, such that in a subsequent slot, the slave transmits while the master receives. Each pair of consecutive slot groups, in which the master transmits and then the slave transmits, may be referred to as a "frame". In Bluetooth, for example, a single time slot may have a duration of six-hundred and twenty-five microseconds [625 μs]. A single slot group may occupy one, three, or five slots. Accordingly, a frame may occupy two, four, six, eight, or ten slots.

The host piconet 140 may be established such that the slots of the TDD scheme are of uniform duration and alignment, known to both the host device 130 and the primary device 110. Timing adjustments may occasionally be necessary to prevent the host device 130 and/or the primary device 110 from losing synchronization with the other. The P/S piconet 150 may be established similarly, such that the slots of the TDD scheme are of uniform duration and alignment, known to both the primary device 110 and the secondary device 120.

Figure 3:
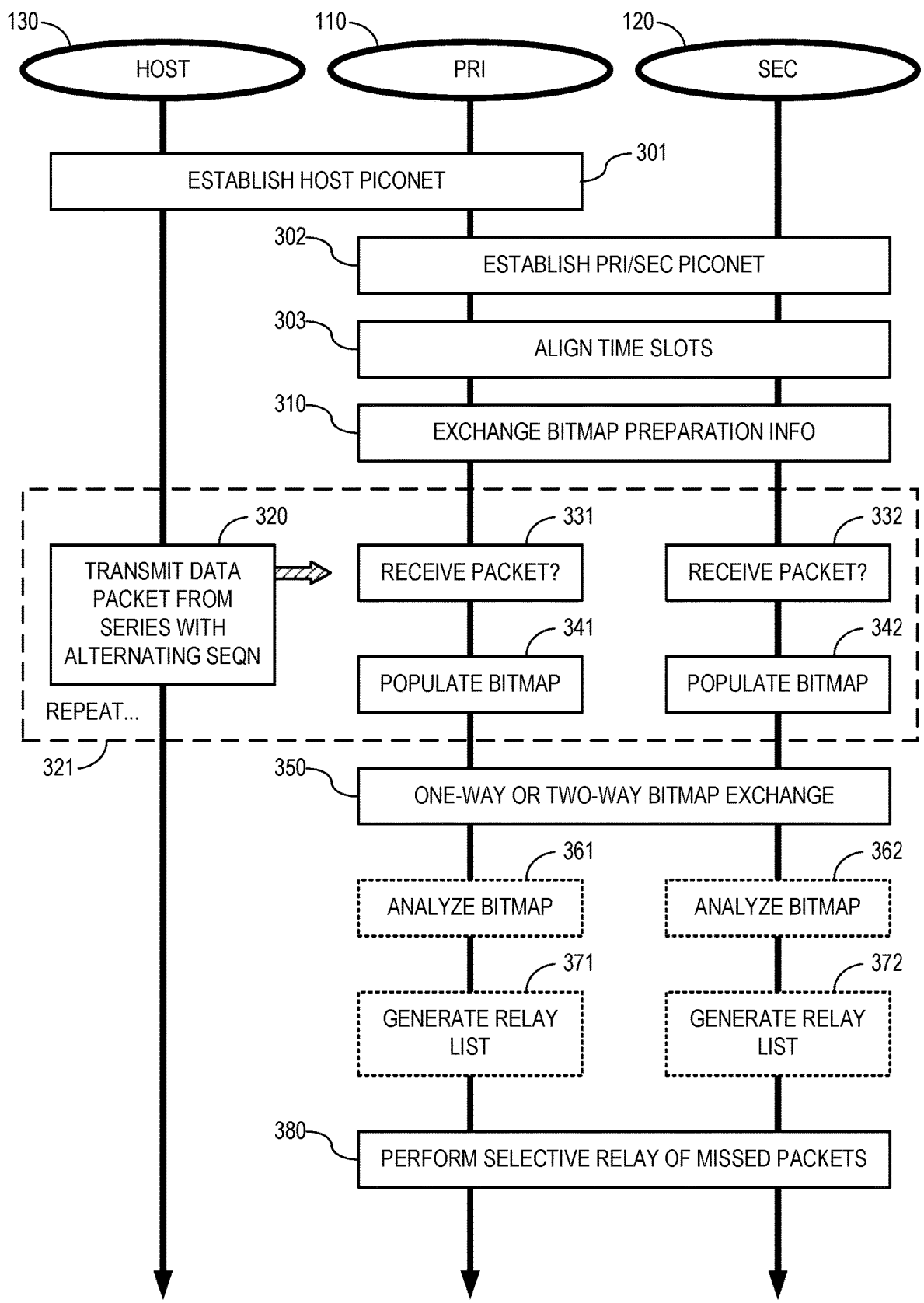
FIG. 3 generally illustrates an example signal flow diagram showing communications between the elements of the wireless environment depicted in FIG. 1 in accordance with aspects of the disclosure.

FIG. 3 generally illustrates an example signal flow diagram showing communications between the elements of the wireless environment 100 depicted in FIG. 1 in accordance with aspects of the disclosure.

At 301, the host device 130 and the primary device 110 coordinate to establish the host piconet 140. At 302, the primary device 110 and the secondary device 120 coordinate to establish the P/S piconet 150. The primary device 110 may share control data relating to the host piconet 140 with the secondary device 120, as noted above.

At 303, the primary device 110 and the secondary device 120 will align time slots of the P/S piconet 150 with time slots of the host piconet 140. This may be done by delaying or advancing a timing of the beginning of a frame sequence associated with the P/S piconet 150. In particular, the receiving time slots of the secondary device 120 should be matched with (substantially simultaneous to) the receiving time slots of the primary device 110. Accordingly, the receiving slots of both the primary device 110 and the secondary device 120 will align with the transmitting slots of the host device 130 on the host piconet 140. As a result, the secondary device 120 can eavesdrop on the data packet transmissions of the host device 130. In some implementations, the aligning at 303 may be performed during the establishing of the P/S piconet 150 at 302.

Figure 4:
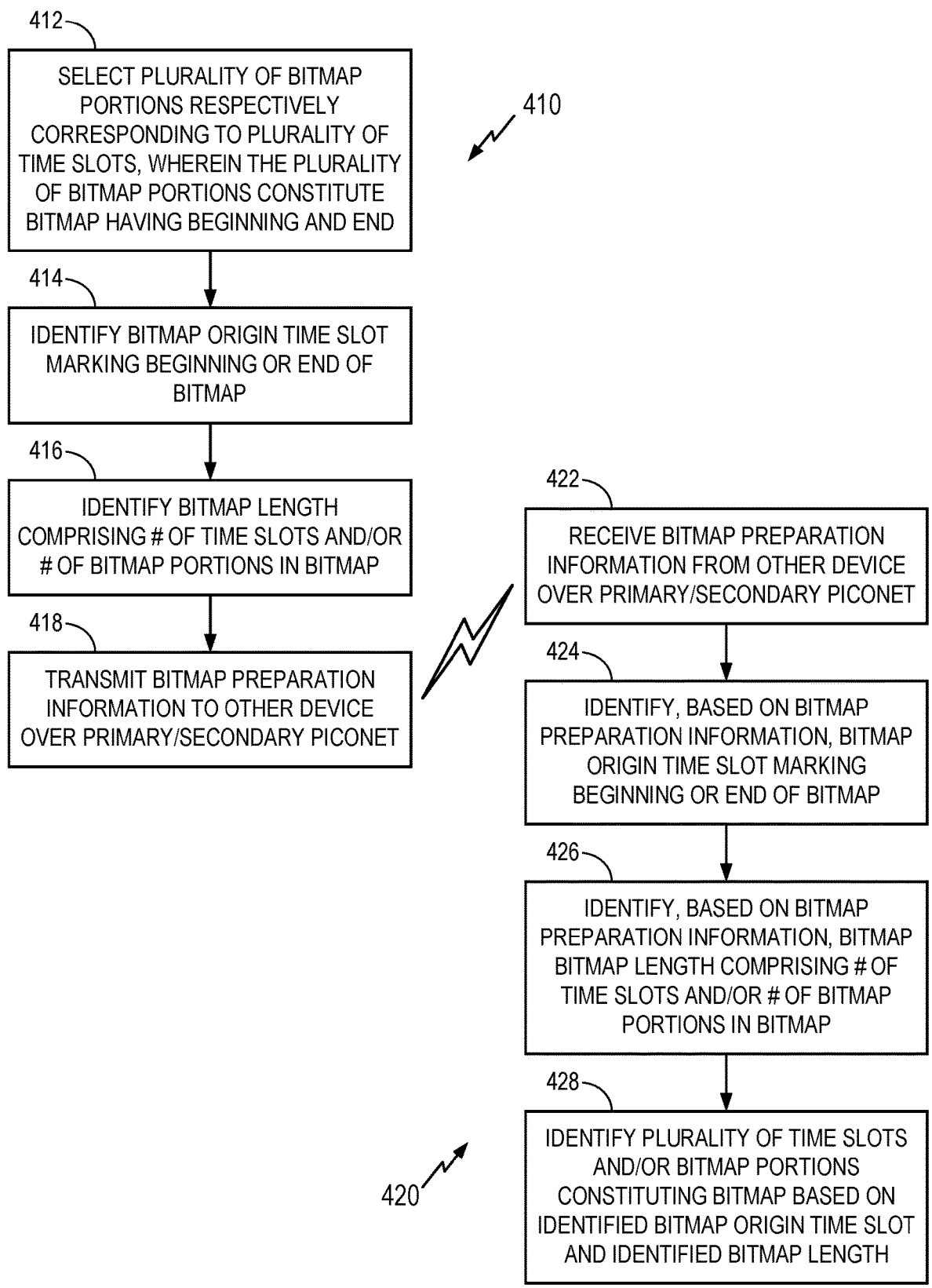
FIG. 4 generally illustrates a method for generating and transmitting bitmap preparation information and a method for receiving and analyzing bitmap preparation information in accordance with aspects of the disclosure.

At 310, the primary device 110 and the secondary device 120 exchange bitmap preparation information, as will be shown in greater detail in FIG. 4. The bitmap preparation information may enable the primary device 110 and the secondary device 120 to coordinate to ensure that a future bitmap exchange (discussed in greater detail below) yields actionable information.

At 320, the host device 130 transmits a data packet from a series of data packets with each data packet having an alternating SEQN. The transmitting at 320 may be performed in accordance with the method 200 depicted in FIG. 2 described previously. At 321, the host device 130 repeats the transmitting at 320. The repeating at 321 may be performed until each data packet in the series of data packets has been transmitted at 320.

At 331, the primary device 110 potentially receives the data packet transmitted by the host device 130. At 332, the secondary device 120 does the same. As noted above, the aligning at 303 should ensure that the listening time slots of both the primary device 110 and the secondary device 120 are coincident with the transmitting slots of the host device 130.

At 341, the primary device 110 populates a bitmap in light of the receiving that could potentially occur at 331. At 342, the secondary device 120 does the same. As discussed above in the description of FIG. 2, the host device 130 may transmit and re-transmit the same data packet until it receives an ACK. The primary device 110 may be the device that transmits the ACK (not shown in FIG. 3). Because the host device 130 does not proceed to a next data packet until an ACK has been received, the primary device 110 may populate a bitmap showing at least one successful reception of every data packet that is transmitted (or re-transmitted) by the host device 130. By contrast, the secondary device 120 does not ACK, and is therefore not guaranteed to effectively receive every data packet. In particular, the host device 130 may transmit a particular data packet and then move on to the next data packet in response to an ACK from the primary device 110, regardless of whether the secondary device 120 has successfully received that particular data packet. The population of bitmaps performed at 341 and/or 342 may be performed in accordance with FIG. 5 or FIG. 6, as will be discussed in greater detail below.

At 350, the primary device 110 and the secondary device 120 perform a bitmap exchange. In some implementations, a bitmap generated by the primary device 110 may be transmitted to the secondary device 120. In other implementations, a bitmap generated by the secondary device 120 may be transmitted to the secondary device 120. In yet other implementations, both the primary device 110 and the secondary device 120 may generate bitmaps and communicate them to each other.

At 361, the primary device 110 analyzes the bitmap received at 350 (assuming that a bitmap was received during the exchanging at 350). At 362, the secondary device 120 does the same. The analyzing of bitmaps performed at 361 and/or 362 may be performed in accordance with one or more of FIGS. 7-9, as will be discussed in greater detail below.

At 371, the primary device 110 generates a relay list based on the analysis performed at 361. At 372, the secondary device 120 does the same. As noted above, in some implementations, there is a one-way bitmap exchange. It will be understood that in the event of a one-way bitmap exchange, only the device that receives a bitmap from the other device will perform the analysis of the bitmap and generation of the relay list.

At 380, the primary device 110 and the secondary device 120 perform a selective relay of missed packets. If the primary device 110 has generated a relay list at 371, then the selective relay at 380 may comprise transmission to the secondary device 120 of missed data packets identified in the relay list. If the secondary device 120 has generated a relay list at 372, then the selective relay at 380 may begin with a transmission of the relay list from the secondary device 120 to the primary device 110. The primary device 110 may then commence transmission to the secondary device 120 of missed data packets.

FIG. 4 generally illustrates a method 410 for generating and transmitting bitmap preparation information and a method 420 for receiving and analyzing bitmap preparation information in accordance with aspects of the disclosure. In some implementations, the primary device 110 performs the method 410 and the secondary device 120 performs the method 420. Alternatively, the secondary device 120 may perform the method 410 and the primary device 110 may perform the method 420. As noted above, the exchange of bitmap preparation information makes it possible for the primary device 110 and the secondary device 120 to coordinate the population and analysis of bitmaps for selective relay of missed data packets.

At 412, the method 410 selects a plurality of bitmap portions respectively corresponding to a plurality of time slots, wherein the plurality of bitmap portions constitute a bitmap having a bitmap beginning and a bitmap end. The selecting at 412 may begin the process of generating bitmap preparation information, and may be prompted by any number of suitable triggers. For example, the method 410 may determine that a certain amount of time has passed or a certain number of packets have been received since the last time selective relay was performed. Additionally or alternatively, the method 410 may determine that the host device 130 has gone silent for whatever reason, and determined that this would be an opportune time to perform a selective relay.

At 414, the method 410 identifies a bitmap origin time slot marking the beginning or the end of the bitmap. The bitmap origin time slot may be associated with a particular packet counter number, a particular sequence number, a particular clock value of the host piconet, and/or a particular clock value of the primary/secondary piconet.

At 416, the method 410 identifies a bitmap length, wherein the bitmap length comprises a number of time slots represented in the bitmap and/or a number of bitmap portions in the bitmap. A direction of the length (forward in time or backward in time with respect to the origin time slot) may be predetermined and known to both the primary device 110 and the secondary device 120. Additionally or alternatively, the bitmap preparation information may explicitly indicate the direction of the length. The direction of the length may determine whether the bitmap origin time slot constitutes the earliest time slot represented by the bitmap (i.e., the beginning) or the latest time slot represented by the bitmap (i.e., the end).

At 418, the method 410 transmits the bitmap preparation information to the other device (for example, the primary device 110 or the secondary device 120). The transmitting at 418 may be performed using the P/S piconet 150.

The selecting at 412, identifying at 414, and identifying at 416 may be performed by, for example, the memory system 114 and the processing system 116 of the primary device 110 depicted in FIG. 1. Accordingly, the memory system 114 and the processing system 116 depicted in FIG. 1 may constitute means for selecting a plurality of bitmap portions respectively corresponding to a plurality of time slots, wherein the plurality of bitmap portions constitute the bitmap, means for identifying a bitmap origin time slot marking the beginning or the end of the bitmap, wherein the bitmap origin time slot is associated with a particular packet counter number, a particular sequence number, a particular clock value of the host piconet, and/or a particular clock value of the primary/secondary piconet, and means for identifying a bitmap length, wherein the bitmap length comprises a number of time slots and/or a number of bitmap portions in the bitmap. The transmitting at 418 may be performed by, for example, the transceiver system 112 depicted in FIG. 1. Accordingly, the transceiver system 112 depicted in FIG. 1 may constitute means for transmitting the bitmap preparation information to another device over a primary/secondary piconet. Alternatively, if the secondary device 120 performs the method 410, the memory system 124 and the processing system 126 may constitute the respective means for selecting, means for identifying, and means for identifying, whereas the transceiver system 122 may constitute the means for transmitting.

At 422, the method 420 receives the bitmap preparation information from the primary device 110. The receiving may be performed using the P/S piconet 150.

At 424, the method 420 identifies the bitmap origin time slot marking the beginning or the end of the bitmap. As noted above, the bitmap origin time slot may be associated with a particular packet counter number, a particular sequence number, a particular clock value of the host piconet, and/or a particular clock value of the primary/secondary piconet. The bitmap origin time slot may be a past time slot, a present time slot, or a future time slot.

At 426, the method 420 identifies a bitmap length. As noted above, the bitmap length may comprise a number of time slots and/or a number of bitmap portions in the bitmap.

At 428, the method 420 identifies the plurality of time slots and/or bitmap portions constituting the bitmap based on the bitmap origin time slot identified at 424 and the bitmap length identified at 426.

The receiving at 422 may be performed by, for example, the transceiver system 122 depicted in FIG. 1. Accordingly, the transceiver system 122 of the secondary device 120 may constitute means for receiving bitmap preparation information from another device over a primary/secondary piconet. The identifying at 424, identifying at 426, and identifying at 428 may be performed by, for example, the memory system 124 and the processing system 126 of the secondary device 120 depicted in FIG. 1. Accordingly, the memory system 124 and the processing system 126 may constitute means for identifying the bitmap origin time slot marking the beginning or the end of the bitmap, means for identifying a bitmap length, and means for identifying a plurality of time slots and/or bitmap portions constituting a bitmap based on the bitmap origin time slot and the bitmap length. Alternatively, if the primary device 110 performs the method 420, the memory system 114 and the processing system 116 may constitute the respective means for identifying, whereas the transceiver system 112 may constitute the means for receiving.

Figure 5:
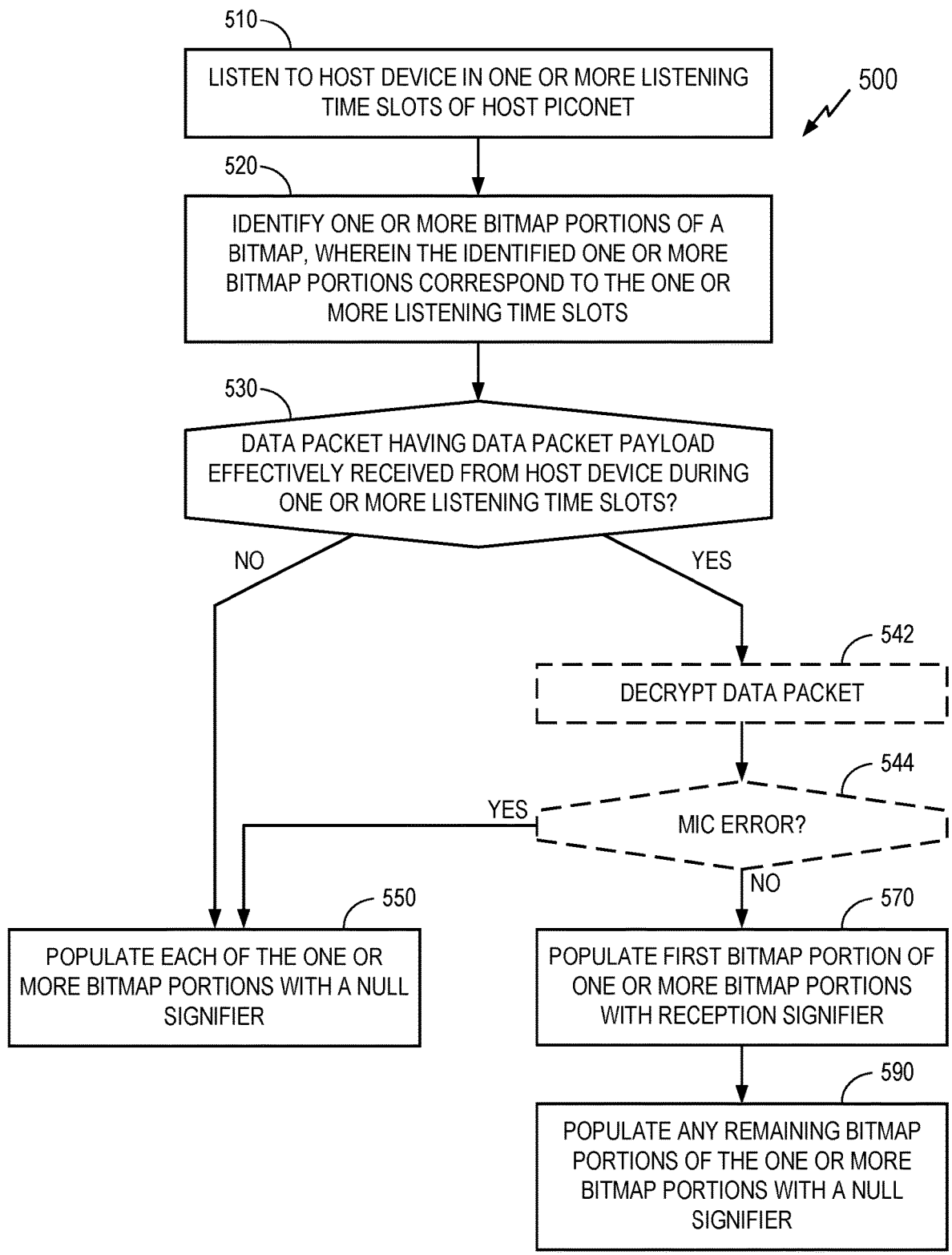
FIG. 5 generally illustrates a method for the primary device and/or the secondary device depicted in FIG. 1 to populate a bitmap in accordance with aspects of the disclosure.

FIG. 5 generally illustrates a method 500 for the primary device 110 and/or the secondary device 120 depicted in FIG. 1 to populate a bitmap in accordance with aspects of the disclosure. As will be discussed in greater detail below, a bitmap populated in accordance with the method 500 may include one-bit bitmap portions, wherein each bitmap portion may represent one of two possible states.

At 510, the method 500 listens to the host device 130 in one or more listening time slots of the host piconet 140.

At 520, the method 500 identifies one or more bitmap portions of a bitmap, wherein the identified one or more bitmap portions correspond to the one or more listening time slots of the host piconet.

At 530, the method 500 determines whether a data packet having a data packet payload is effectively received from the host device during the one or more listening time slots. Effectively-received signaling may include a data packet or a portion thereof. Alternatively, signaling that is not effectively received may comprise signaling that was not transmitted, signaling that was not received, or signaling that was received incompletely or received with errors. The determining at 530 may comprise, for example, receiving a data packet header during the one or more listening time slots, wherein the data packet header indicates whether the data packet includes the data packet payload, and determining that the data packet header indicates that the data packet includes the data packet payload. If the method 500 determines that signaling was not effectively received ('no' at 530), then the method 500 proceeds to 550. If the method 500 determines that signaling was effectively received ('yes' at 530), then the method proceeds to 542.

At 542, the method 500 optionally decrypts the data packet.

At 544, the method 500 optionally determines if the decryption of the data packet caused a message integrity check (MIC) error. If the method 500 determines that the decryption of the data packet caused a MIC error ('yes' at 544), then the method 500 proceeds to 550. If the method 500 determines that the decryption of the data packet did not cause a MIC error ('no' at 544), then the method 500 proceeds to 570.

At 550, the method 500 populates each of the one or more bitmap portions with a null signifier. In the one-bit bitmap populated in accordance with FIG. 5, the null signifier may be represented by either a zero '0' or a one '1'. It will be understood that this the value representing the null signifier may be selected arbitrarily, so long as the value is known to the devices that populate and/or analyze bitmaps. As will be understood from the foregoing, the populating at 550 may occur in response to a determination that a data packet having a data packet payload was not received (as at 530), or in response to a determination that the decryption at 542 resulted in a MIC error at 544.

At 570, the method 500 populates a first bitmap portion of the one or more bitmap portions with a reception signifier. In the one-bit bitmap populated in accordance with FIG. 5, the reception signifier may be represented by the opposite of the value that represents the null signifier.

At 590, the method 500 populates any remaining bitmap portions of the one or more bitmap portions with a null signifier. As noted above, a data packet may be transmitted over the duration of, for example, one slot, three slots, or five slots. If the data packets are transmitted over the duration of one slot, then that slot corresponds to the 'first' bitmap portion (which is populated at 570 with a reception signifier) and there are no remaining bitmap portions (and so the populating at 590 amounts to nothing). If the data packets are transmitted over the duration of three or five slots, then the earliest slot corresponds to the 'first' bitmap portion (which is populated at 570 with a reception signifier) and the later slots constitute the remaining bitmap portions (which are populated at 590 with a null signifier).

If the method 500 is performed by the primary device 110, then the listening at 510 may be performed by, for example, the transceiver system 112 depicted in FIG. 1. Accordingly, the transceiver system 112 may constitute means for listening to a host device in a listening time slot of a host piconet. The remaining operations depicted in FIG. 5 may be performed by, for example, the memory system 114 and/or the processing system 116 depicted in FIG. 1. Accordingly, the memory system 114 and/or the processing system 116 may constitute means for identifying one or more bitmap portions of a bitmap, wherein the identified one or more bitmap portions corresponds to the one or more listening time slots of the host piconet, means for determining whether a data packet having a data packet payload is effectively received from the host device during the one or more listening time slots, means for decrypting a data packet, means for determining whether the decrypting passes a message integrity check, means for populating a first bitmap portion of the one or more bitmap portions with a reception signifier, means for populating any remaining bitmap portions of the one or more bitmap portions with a null signifier, and means for populating each of the one or more values with the null signifier. Alternatively, if the method 500 is performed by the secondary device 120, then the transceiver system 122 may constitute the means for listening, whereas the memory system 124 and/or the processing system 126 may constitute means for performing operations similar to the memory system 114 and/or the processing system 116.

Figure 6:
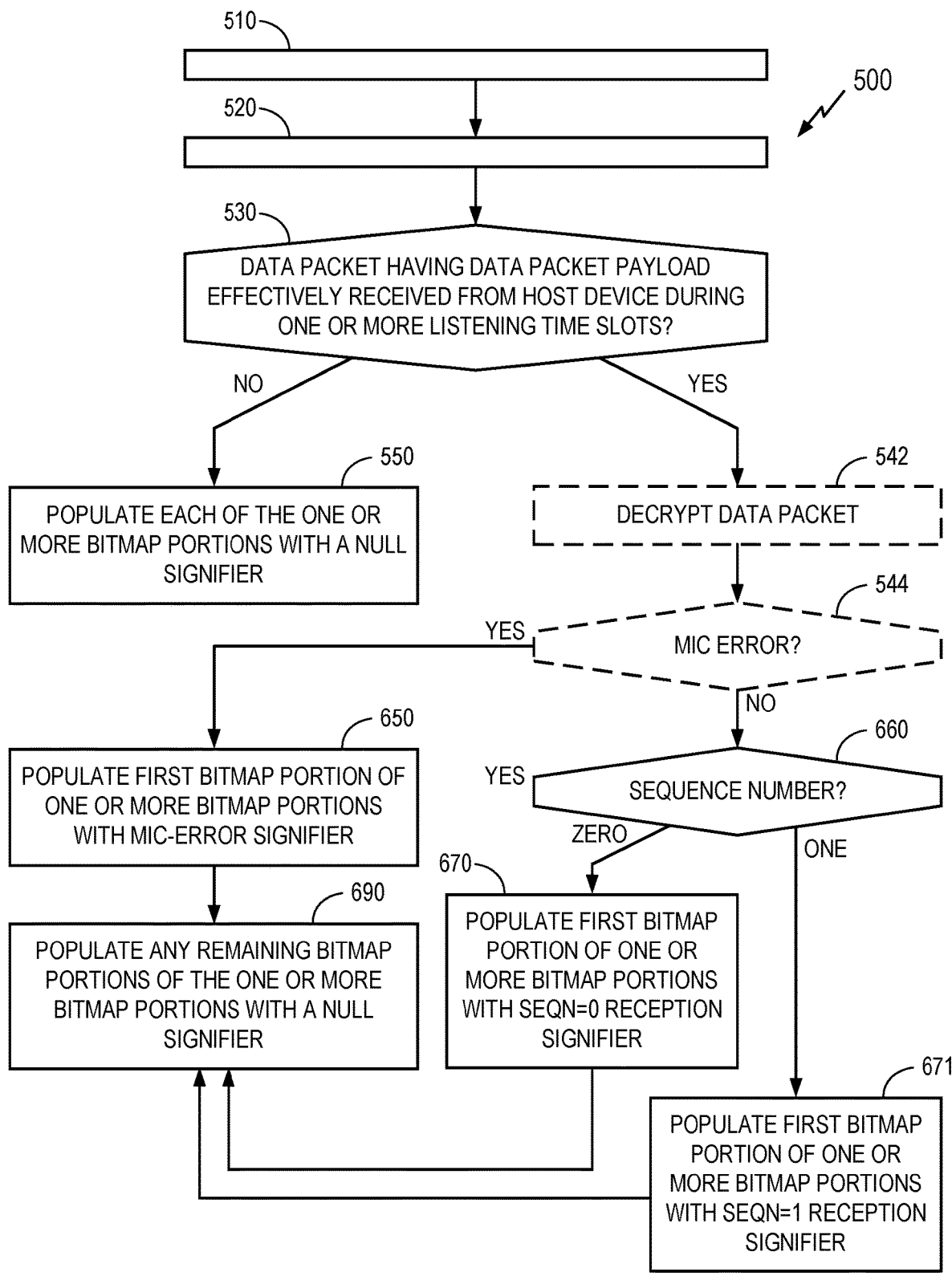
FIG. 6 generally illustrates another method for the primary device and/or the secondary device depicted in FIG. 1 to populate a bitmap in accordance with aspects of the disclosure.

FIG. 6 generally illustrates another method 600 for the primary device 110 and/or the secondary device 120 depicted in FIG. 1 to populate a bitmap in accordance with aspects of the disclosure. By contrast to the method 500, a bitmap populated in accordance with the method 600 may include two-bit bitmap portions, wherein each bitmap portion may represent one of four possible states.

The difference between the method 500 and the method 600 relates to the populating of the first bitmap portion. However, there are several operations that are common to the method 500 and the method 600. In particular, the listening at 510, the identifying at 520, the determining at 530, the optional decrypting at 542, the optional determining at 544, and the populating at 550 may be the same as described above. Accordingly, further description thereof is omitted for brevity.

As noted above, the method 600 may optionally include the decrypting (at 542) and the determining (at 544) as to whether the decryption passes a message integrity check. Unlike the one-bit bitmap populated in accordance with FIG. 5 (in which the one or more bitmap portions were populated regardless of whether the method 500 flowed from 530 or 544, the two-bit bitmap populated in accordance with FIG. 6 can be used to differentiate between reception failures and MIC errors.

Accordingly, at 650, the method 600 populates a first bitmap portion of the one or more bitmap portion with a MIC-error signifier and then proceeds to 690. The populating at 690 may be analogous to the populating at 590 (in which any remaining bitmap portions are populated with a null signifier). Accordingly, further description thereof will be omitted for brevity.

At 660, the method 600 determines a sequence number associated with the data packet. As noted above, one of the conditions for proceeding to the determining at 660 is that a data packet having a data packet payload must be determined at 530 to have been received. The data packet may include a data packet header that indicates whether the data packet has a data packet payload and/or a SEQN associated with the data packet. If the method 600 determines that the sequence number is SEQN=0 ('zero' at 660), then the method 600 proceeds to 670. If the method 600 determines that the sequence number is SEQN=1 ('one' at 622), then the method proceeds to 671.

At 670, the method 600 populates the first bitmap portion with a sequence-number-zero reception signifier. At 671, the method 600 populates the first bitmap portion with a sequence-number-one reception signifier.

As noted above with respect to FIG. 5, the null signifier and the reception signifier may be indicated using a single bit. For example, a zero may represent the null signifier and a one may represent the reception signifier. However, which signifier corresponds to which value is arbitrarily selected and known to the respective devices. Similarly, the four signifiers associated with the two-bit bitmap populated in accordance with FIG. 6 may also correspond to arbitrarily-selected values. For example, the null signifier may be represented by a '00', the MIC-error signifier may be represented by a '01', the sequence-number-zero signifier may be represented by a '10', and the sequence-number-one signifier may be represented by a '11'.

The bitmaps populated in accordance with FIGS. 5-6 may be packaged into a bitmap package and transmitted. The bitmap package may also include additional information, for example, slot count information indicating a maximum number of slots over which the data packet might be received, packet type information indicating a type of the data packet, retransmission information indicating whether the data packet is a new data packet or a retransmitted data packet, or any combination thereof.

Figure 7:
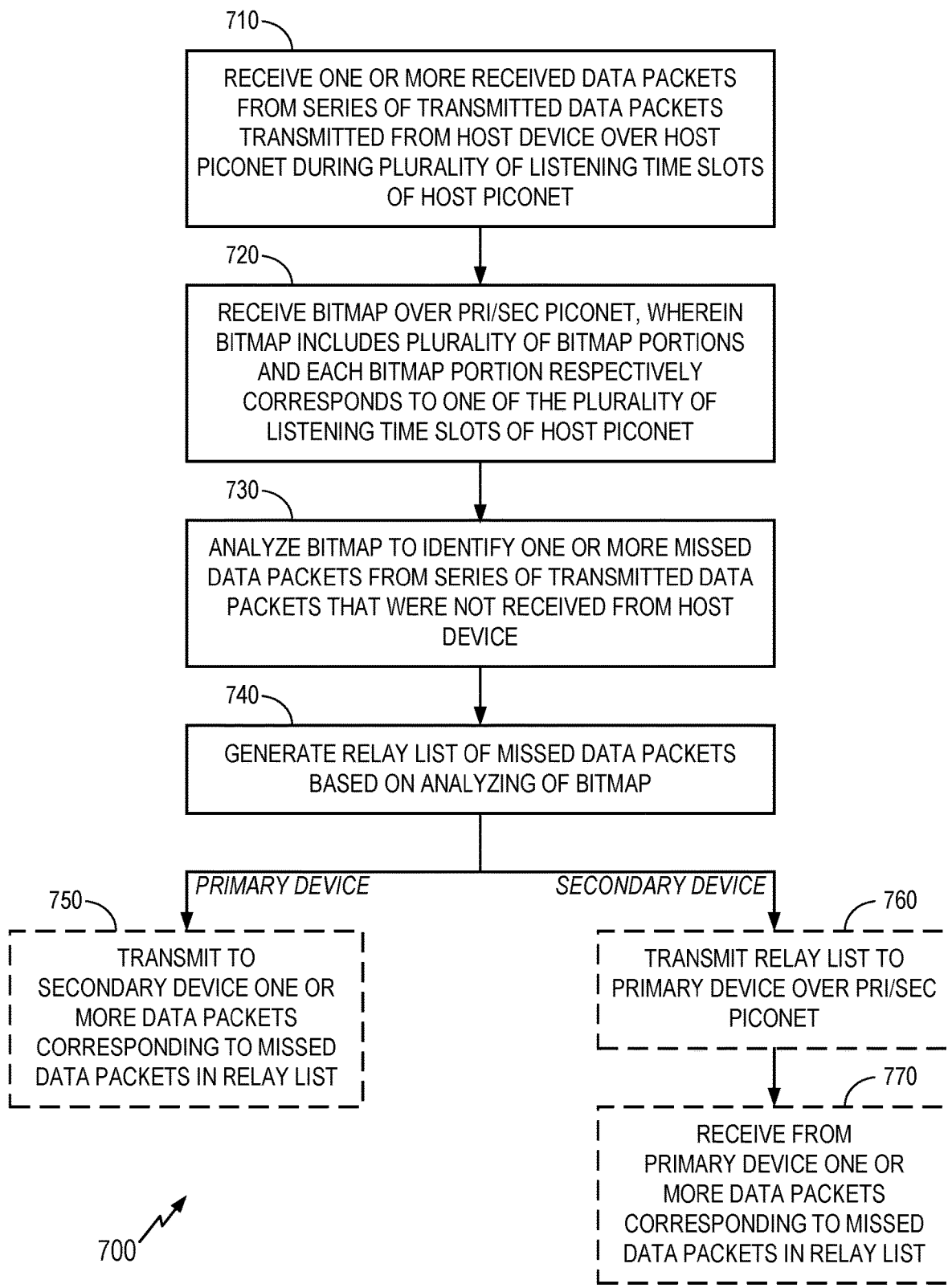
FIG. 7 generally illustrates a method for the primary device and/or the secondary device depicted in FIG. 1 to generate a relay list based on a bitmap in accordance with aspects of the disclosure.

FIG. 7 generally illustrates a method 700 for the primary device 110 and/or the secondary device 120 depicted in FIG. 1 to generate a relay list based on a bitmap in accordance with aspects of the disclosure.

At 710, the method 700 receives one or more received data packets from a series of transmitted data packets that are transmitted from the host device 130 over the host piconet 140 during a plurality of listening time slots of the host piconet 140.

At 720, the method 700 receives a bitmap over the P/S piconet 150, wherein the bitmap includes a plurality of bitmap portions and each bitmap portion respectively corresponds to one of the plurality of listening time slots of the host piconet 140.

At 730, the method 700 analyzes the bitmap to identify one or more missed data packets from the series of transmitted data packets that were not received from the host device 130.

At 740, the method 700 generates a relay list of missed data packets based on the analyzing of the bitmap.

If the primary device 110 performs the method 700, then the method 700 may optionally proceed to 750, as indicated in FIG. 7. At 750, the method 700 transmits to the secondary device 120 one or more data packets corresponding to the missed data packets in the relay list.

If the secondary device 120 performs the method 700, then the method 700 may optionally proceed to 760 and 770, as indicated in FIG. 7. At 760, the method 700 transmits the relay list to the primary device 110. At 770, the method 700 receives from the primary device 110 one or more data packets corresponding to the missed data packets in the relay list.

If the primary device 110 performs the method 700, then the receiving at 710 and the receiving at 720 may be performed by, for example, the transceiver system 112 of the primary device 110 depicted in FIG. 1. Accordingly, the transceiver system 112 may constitute means for receiving one or more received data packets from a series of transmitted data packets that are transmitted from a host device over a host piconet during a plurality of listening time slots of the host piconet and means for receiving a bitmap over a primary/secondary piconet, wherein the bitmap includes a plurality of bitmap portions and each bitmap portion respectively corresponds to one of the plurality of listening time slots of the host piconet. The analyzing at 730 and the generating at 740 may be performed by, for example, the memory system 114 and/or the processing system 116 of the primary device 110 depicted in FIG. 1. Accordingly, the memory system 114 and/or the 116 may constitute means for analyzing the bitmap to identify one or more missed data packets from the series of transmitted data packets that were not received from the host device and means for generating a relay list of missed data packets based on the analyzing of the bitmap. Alternatively, if the secondary device 120 performs the method 700, then the receiving at 710 and the receiving at 720 may be performed by the transceiver system 122, whereas the analyzing at 730 and the generating at 740 may be performed by the memory system 124 and/or the processing system 126. Accordingly, the transceiver system 122 may constitute the respective means for receiving and means for receiving, whereas the memory system 124 and/or the processing system 126 may constitute means for analyzing and means for generating. The transmitting at 750 may be performed by, for example, the transceiver system 112. Accordingly, the transceiver system 112 may constitute means for transmitting to the secondary device one or more data packets corresponding to the missed data packets in the relay list. The transmitting at 760 and the receiving at 770 may be performed by, for example, the transceiver system 122. Accordingly, the transceiver system 112 may constitute means for transmitting the relay list to the primary device and means for receiving from the primary device one or more data packets corresponding to the missed data packets in the relay list.

Figure 8:
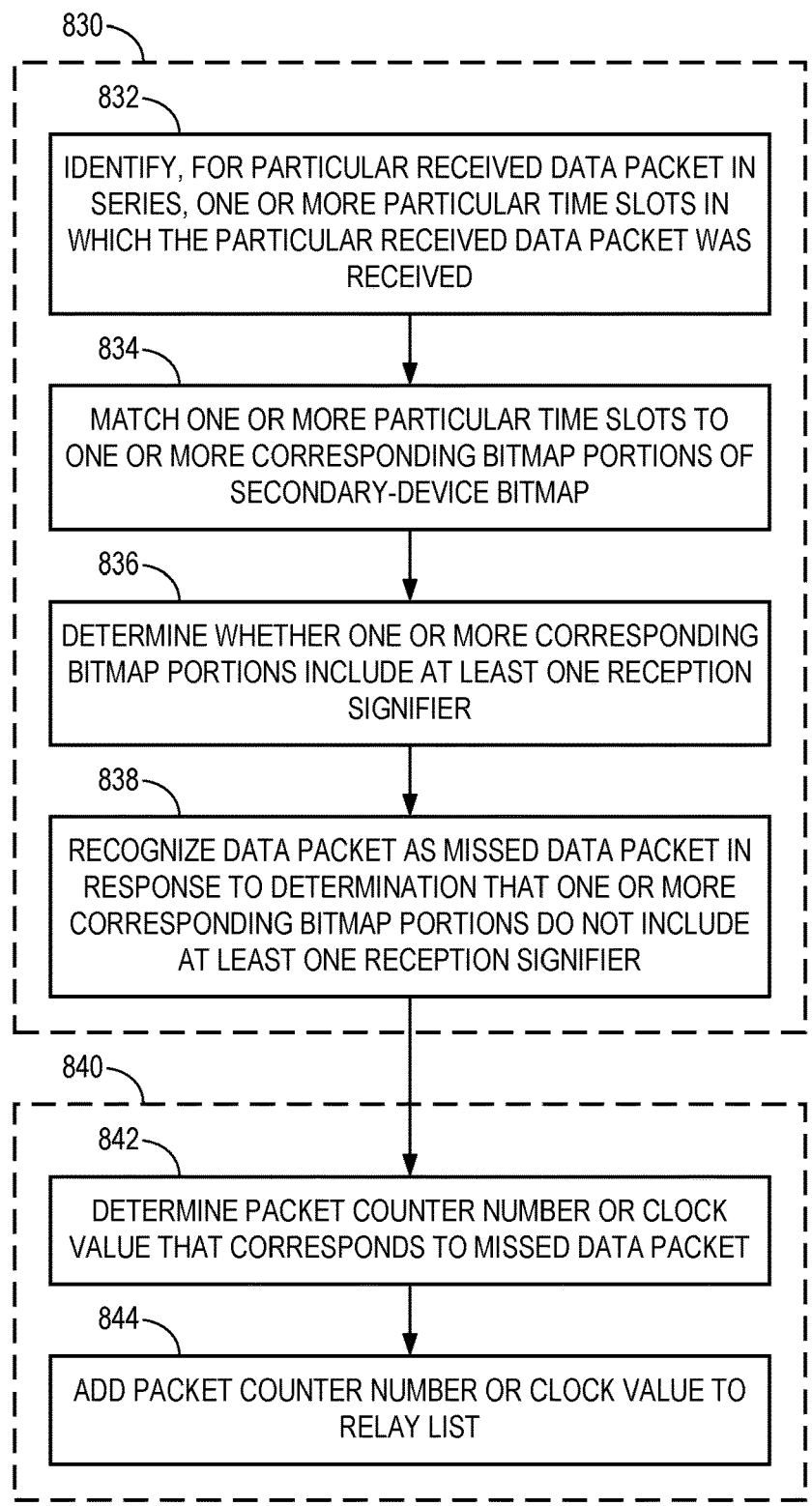
FIG. 8 generally illustrates a method for the primary device to generate the relay list of FIG. 7.

FIG. 8 generally illustrates a method 800 for the primary device 110 to generate the relay list of FIG. 7. As noted above with respect to FIG. 7, the analyzing at 730 and the generating at 740 may be performed by either the primary device 110 or the secondary device 120. The analyzing at 830 depicted in FIG. 8 corresponds to the analyzing at 730 depicted in FIG. 7, but includes additional operations that might be performed in the event that the analyzing is being performed by the primary device 110. Likewise, the generating at 840 depicted in FIG. 8 corresponds to the generating at 740 depicted in FIG. 7, but includes additional operations that might be performed in the event that the analyzing is being performed by the primary device 110.

At 832, the method 800 identifies, for a particular received data packet in the series, one or more particular time slots in which the particular received data packet was received.

At 834, the method 800 matches the one or more particular time slots to one or more corresponding bitmap portions of the secondary-device bitmap.

At 836, the method 800 determines whether the one or more corresponding bitmap portions include at least one reception signifier. The at least one reception signifier may be analogous to the reception signifier described above in relation to FIG. 5, the sequence-number-zero reception signifier described above in relation to FIG. 6, or the sequence-number-one reception signifier described above in relation to FIG. 6.

At 838, the method 800 recognizes the data packet as a missed data packet in response to a determination that the one or more corresponding bitmap portions do not include the at least one reception signifier.

At 842, the method 800 determines a packet counter number or a clock value that corresponds to the missed data packet.

At 844, the method 800 adds the determined packet counter number or clock value to the relay list.

Figure 9:
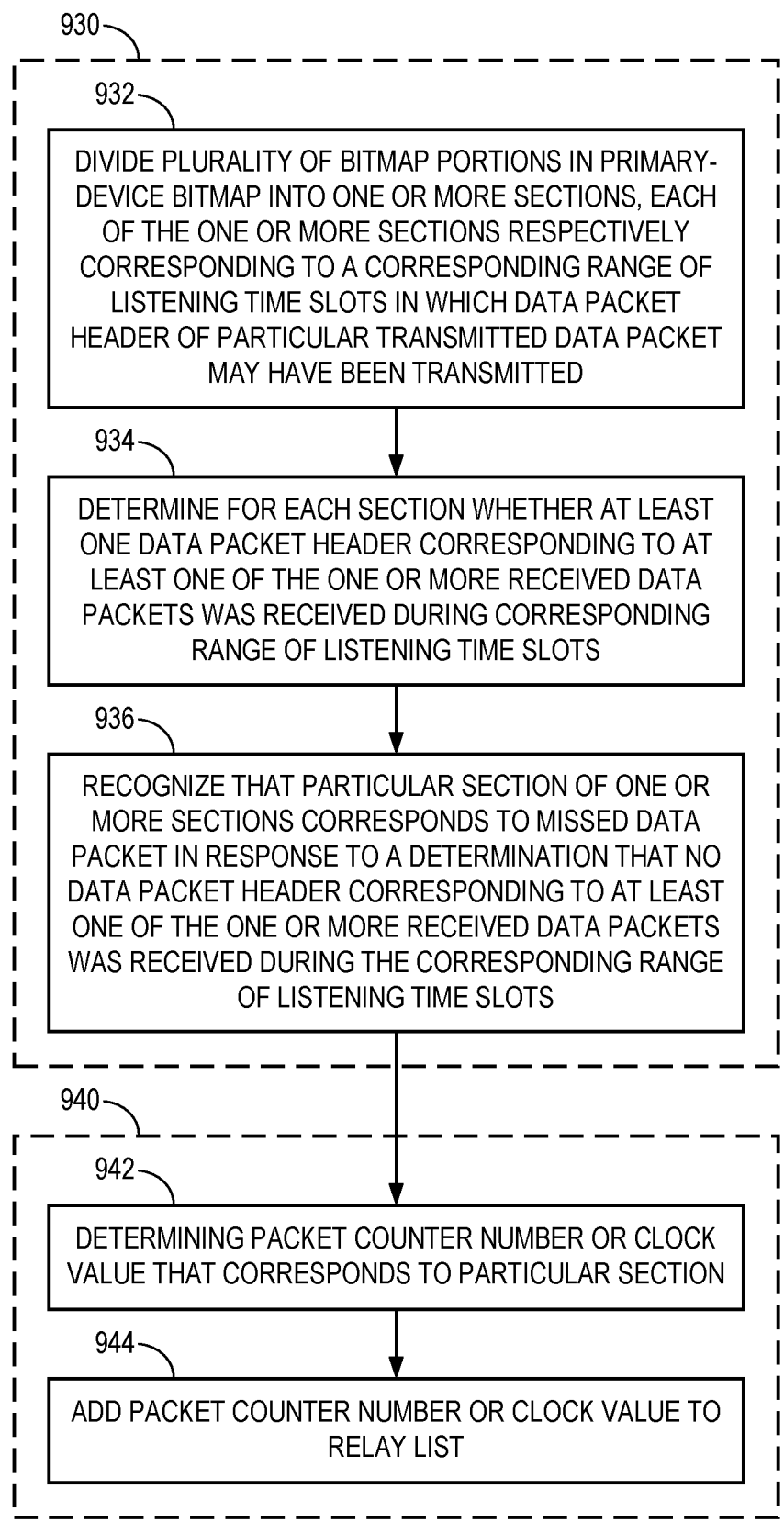
FIG. 9 generally illustrates a method for the secondary device to generate the relay list of FIG. 7.

FIG. 9 generally illustrates a method 900 for the secondary device 120 to generate the relay list of FIG. 7. As noted above with respect to FIG. 7, the analyzing at 730 and the generating at 740 may be performed by either the primary device 110 or the secondary device 120. The analyzing at 930 depicted in FIG. 9 corresponds to the analyzing at 730 depicted in FIG. 7, but includes additional operations that might be performed in the event that the analyzing is being performed by the secondary device 120. Likewise, the generating at 940 depicted in FIG. 9 corresponds to the generating at 740 depicted in FIG. 7, but includes additional operations that might be performed in the event that the analyzing is being performed by the secondary device 120.

At 932, the method 900 divides the plurality of bitmap portions in the primary-device bitmap into one or more sections, each of the one or more sections respectively corresponding to a corresponding range of listening time slots in which a data packet header of a particular transmitted data packet in the series of transmitted data packets may have been transmitted.

At 934, the method 900 determines for each of the one or more sections whether at least one data packet header corresponding to at least one of the one or more received data packets was received during the corresponding range of listening time slots.

At 936, the method 900 recognizes that a particular section of the one or more sections corresponds to a missed data packet in response to a determination that no data packet header corresponding to at least one of the one or more received data packets was received during the corresponding range of listening time slots.

At 942, the method 900 determines a packet counter number or clock value that corresponds to the particular section.

At 944, the method 900 adds the determined packet counter number or clock value to the relay list.

FIGS. 10-13 relate to an example scenario in which communications among the devices depicted in FIG. 1 are conducted with varying degrees of success. It will be illustrated that by performing operations in accordance with the present disclosure (i.e., by practicing the methods depicted in FIGS. 2-9), the primary device 110 and/or secondary device 120 may effectively perform a selective relay of missed data packets with reduced overhead and/or fewer re-transmissions.

Figure 10:
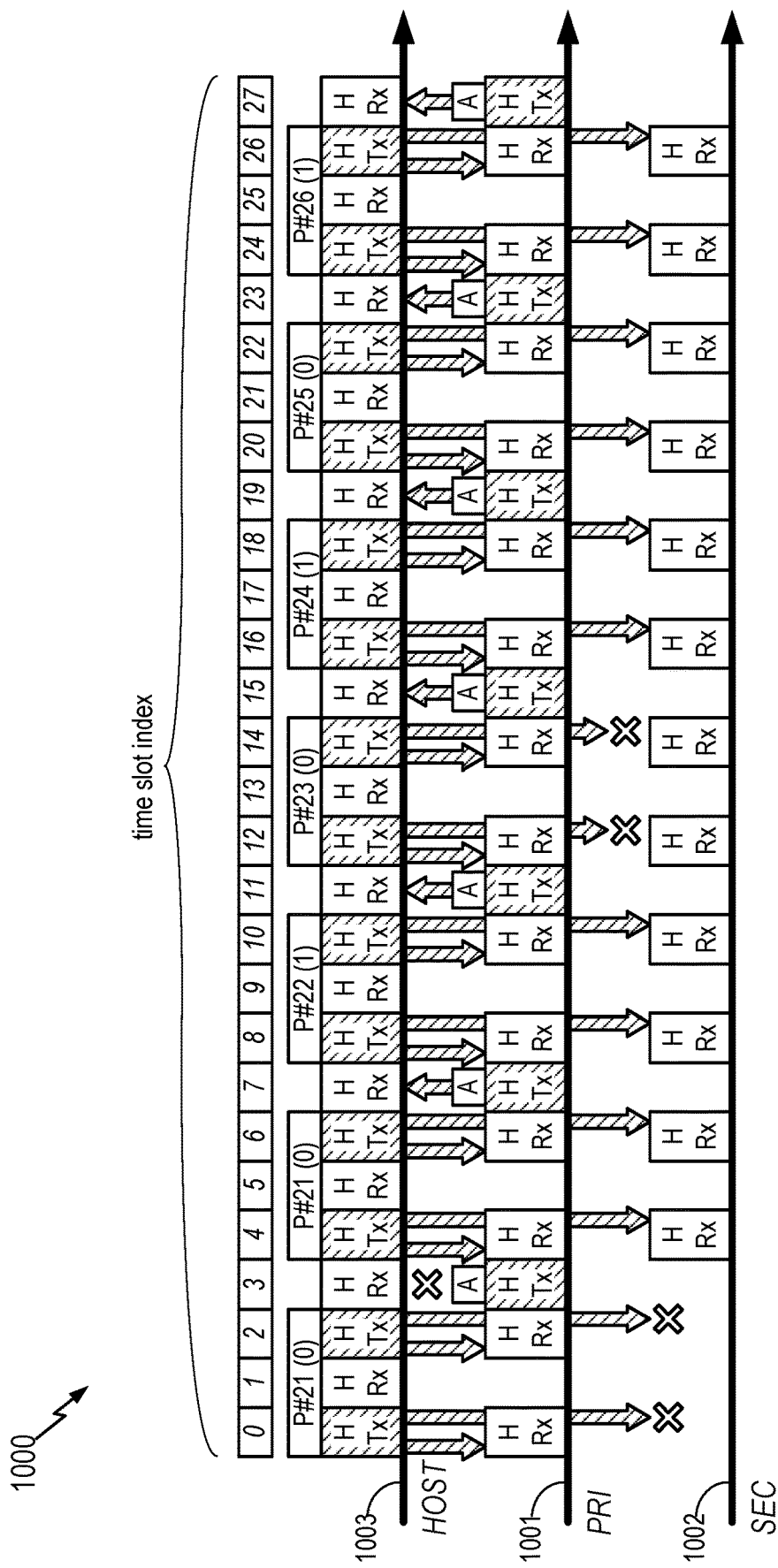
FIG. 10 generally illustrates a timing diagram for example communications among the primary device, the secondary device, and the host device depicted in FIG. 1.

FIG. 10 generally illustrates a timing diagram 1000 for example communications among the primary device 110, the secondary device 120, and the host device 130 depicted in FIG. 1. It will be understood that the scenario depicted in FIG. 10 is a concrete example provided solely for illustration, and that the various methods depicted in FIGS. 5-9 may be practiced in scenarios that differ from the scenario depicted in FIG. 10.

The timing diagram 1000 includes a primary device timeline 1001 showing operations of the primary device 110, a secondary device timeline 1002 showing operations of the secondary device 120, and a host device timeline 1003 showing operations of the host device 130. The timing diagram 1000 is divided into twenty-eight time slots indexed with labels '0' through '27'. In the example scenario depicted in FIG. 10, these twenty-eight time slots will be represented by a bitmap. Although twenty-eight time slots are depicted, beginning with a zeroth time slot, it will be understood that this is for illustrative purposes, and that there may be any number of time slots beginning or ending at any particular time slot index.

In light of the previous discussion, it will be understood that the communications between the host device 130 and the primary device 110 may be performed over the host piconet 140. Moreover, the time slots may be organized into frames, wherein the master of the host piconet 140 (the host device 130 in this particular example) transmits in a first time slot of the frame and the slave of the host piconet 140 (the primary device 110) transmits in a second time slot of the frame. Accordingly, the host device 130 will transmit in even-numbered time slots ('0', '2', '4', etc.) while the primary device 110 receives and the primary device 110 will transmit in odd-numbered time slots ('1', '3', '5', etc.) while the host device 130 receives.

It will be further understood that the time slots of the P/S piconet 150 are aligned with the time slots of the host piconet 140. This facilitates eavesdropping on the part of the secondary device 120.

In this scenario, the host device 130 is in the midst of transmitting a series of data packets. Each data packet is a three-slot data packet, meaning that the beginning of the data packet is transmitted in a first transmitting time slot of the host piconet 140 (for example, time slot '0') and that the end of the data packet is transmitted in a next transmitting time slot of the host piconet 140 (i.e., time slot '2'), which is separated from the first transmitting time slot by a receiving time slot (i.e., time slot '1'). Although three-slot data packets are depicted in FIG. 10, it will be understood that data packets may occupy any suitable number of slots, for example, one slot, three slots, five slots, etc.

The first data packet shown in FIG. 10 is packet #21 having SEQN=0. As an example, packet #21 may be preceded by twenty earlier packets that are not shown in FIG. 10 because they were not transmitted during the twenty-eight time slots that are to be represented by the bitmap. In this example scenario, the beginning of packet #21 and the end of packet #21 are received by the primary device 110 in time slots '0' and '2', respectively. The primary device 110 responds by transmitting an ACK to the host device 130 during a later transmitting slot of the host piconet 140 (in particular, time slot '3'). For some reason (possibly interference), the host device 130 does not receive the ACK transmitted by the primary device 110 (as symbolized by the "x" depicted in FIG. 10 between the primary device timeline 1001 and the host device timeline 1003). In the present example, the secondary device 120 is (for whatever reason) not receiving at this time, and therefore misses the initial transmission of packet #21.

Because the host device 130 does not receive the ACK transmitted in time slot '3', the host device 130 determines to re-transmit packet #21. As a result, the beginning of packet #21 and the end of packet #21 are re-transmitted by the primary device 110 in time slots '4' and '6', respectively. This time, the re-transmitted packet #21 is received by both the primary device 110 and the secondary device 120. Because the primary device 110 has successfully received packet #21, another ACK may be transmitted in time slot '7'. This time, the ACK is received by the host device 130, which proceeds to the next data packet in the series, in particular, a packet #22 having a SEQN=1.

From this point forward, in the present example, each packet is successfully transmitted to the primary device 110 and each ACK is successfully received by the host device 130. Accordingly, packet #23 having SEQN=0 is transmitted in slots '12' and '14', packet #24 having SEQN=1 is transmitted in slots '16' and '18', packet #25 having SEQN=0 is transmitted in slots '20' and '22', and packet #26 is transmitted in slots '24' and '26'. The secondary device 120, in the present example, receives every data packet with the exception of packet #23.

Figure 11:
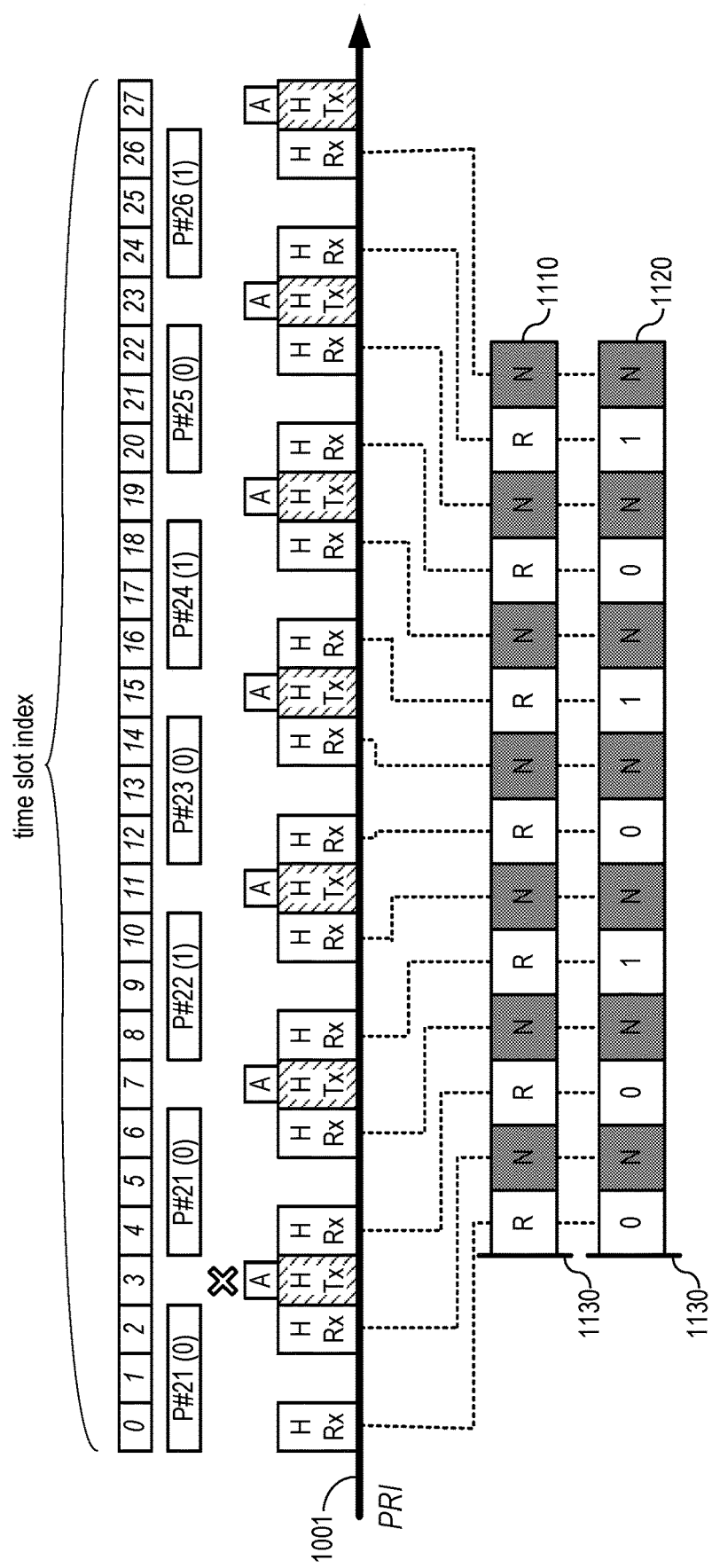
FIG. 11 generally illustrates a plurality of example bitmaps populated by the primary device in response to the communications depicted in FIG. 10.
Figure 12:
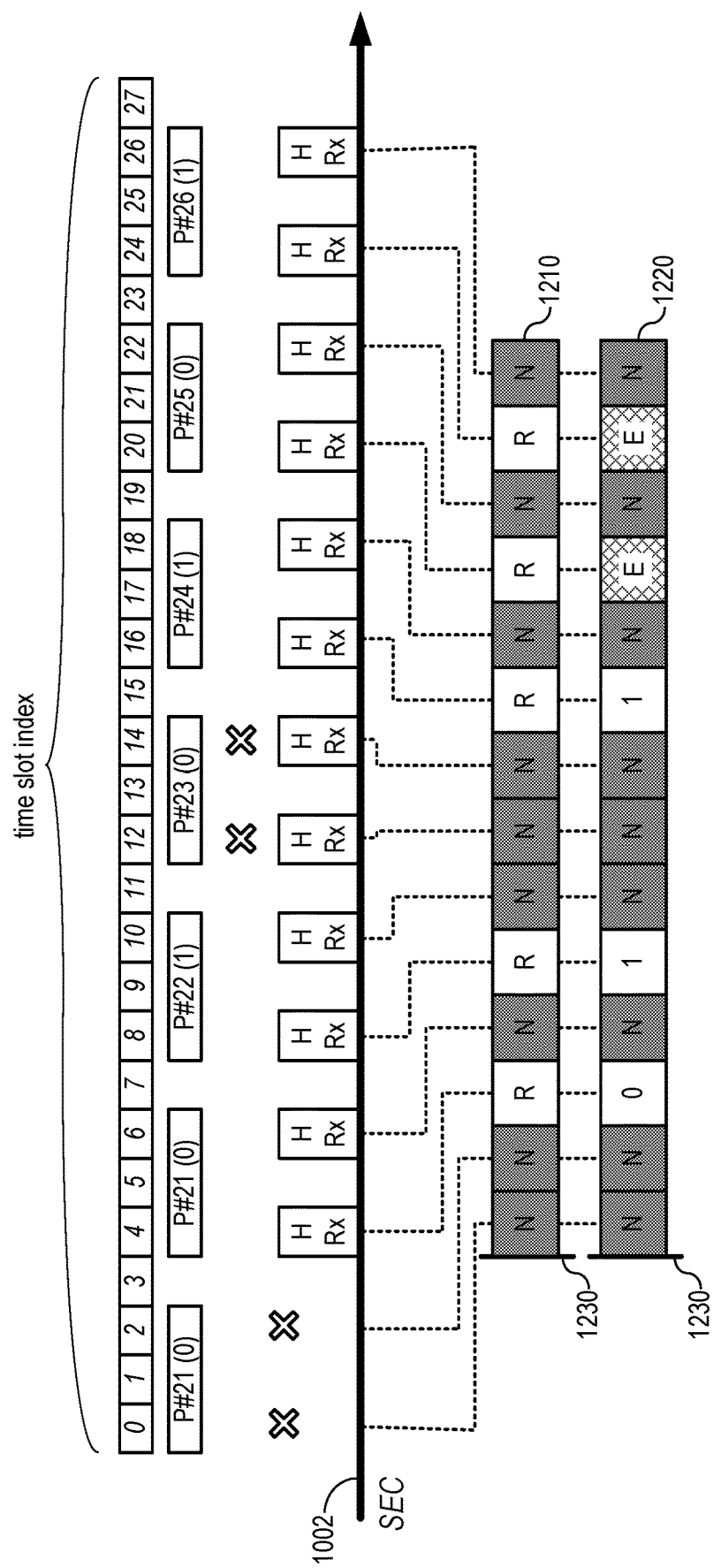
FIG. 12 generally illustrates a plurality of example bitmaps populated by the secondary device in response to the communications depicted in FIG. 10.

As a result, the secondary device 120 has an incomplete series of data packets in which packet #23 is a missed data packet. Moreover, as will be discussed in greater detail below, errors may arise in the processing of the data packets that were successfully received. In accordance with aspects of the disclosure, bitmaps may be exchanged between the primary device 110 and the secondary device 120 for the purposes of determining that packet #23 is a missed data packet and selectively relaying packet #23 to the secondary device 120. FIG. 11 and FIG. 12 represent the same scenario as depicted in FIG. 10, but further illustrate the bitmaps that may be generated by the primary device 110 and the secondary device 120, respectively.

FIG. 11 generally illustrates a plurality of example bitmaps populated by the primary device 110 in response to the communications depicted in FIG. 10. As will be understood from FIG. 11, the primary device timeline 1001 is reproduced from FIG. 10 and the operations performed thereon are identical to the operations depicted in FIG. 10. For clarity, the time slot index is also shown (exactly as depicted in FIG. 10) and the timing of the packet transmission is indicated (exactly as depicted in FIG. 10).

As shown in FIG. 11, there are two example bitmaps that might be generated by the primary device 110 in the example scenario of FIG. 10. In a first example, a bitmap 1110 is a one-bit bitmap in which each bitmap portion may represent two possible states, as per the method 500 depicted in FIG. 5. In a second example, a bitmap 1120 is a two-bit bitmap in which each bitmap portion may represent up to four states, as per the method 600 depicted in FIG. 6.

The bitmap 1110 will be explained as follows. As noted above, bitmap 1110 is a bitmap with one-bit portions. Each bitmap portion may be populated with a null signifier or a reception signifier. In FIG. 11, the null signifier and the reception signifier are represented as 'N' and 'R' respectively.

The bitmap 1110 includes a bitmap boundary 1130 that marks a an origin time slot of the bitmap 1110. The characteristics of the bitmap 1110 (origin time slot, length, etc.) may be defined in bitmap preparation information, as described above with respect to FIG. 4. In the present example, the bitmap preparation information may indicate that the bitmap 1110 should begin at origin time slot '0' and extend later in time by a length of twenty-eight time slots. Of the twenty-eight time slots to be represented by the bitmap 1110, it will be understood that only fourteen are listening time slots. Accordingly, the bitmap 1110 representing these twenty-eight time slots may include fourteen bitmap portions corresponding to each of the listening time slots (i.e., the even-numbered time slots '0', '2', etc.)

To populate the bitmap, the primary device 110 may first determine whether a data packet having a data packet payload is effectively received during time slots '0' and '2'. As discussed above with respect to FIG. 5, the primary device 110 may proceed to populate (as at 570) the first bitmap portion (i.e., the bitmap portion correspond to the earliest time slot, time slot '0') with a reception signifier ('R' in FIG. 11). Moreover, the primary device 110 may proceed to populate any remaining bitmap portions (i.e., the bitmap portion corresponding to time slot '2') with a null signifier ('N' in FIG. 11). In the present example, the primary device 110 does not miss a data packet. Accordingly, the example bitmap 1110 consists entirely of alternating reception signifiers and null signifiers.

The bitmap 1120 will be explained as follows. Like the one-bit bitmap 1110, the bitmap 1120 may include the null signifier (represented again as 'N'). Similar to the bitmap 1110, the bitmap 1120 includes a null signifier in every other bitmap portion. The bitmap 1120 may be populated based on the same bitmap preparation information as the bitmap 1110 and may therefore have the same bitmap boundary 1130 and bitmap length.

Unlike the bitmap 1110, the bitmap 1120 distinguishes between receptions associated with a SEQN=0 and receptions associated with a SEQN=1. For each received data packet, the data packet header may indicate the sequence number of the packet. By contrast to the bitmap 1110, in which every reception is marked by an 'R', the bitmap 1120 is populated with the sequence number of the received packet, i.e., a '0' (signifying that a header of a data packet with SEQN=0 was received) or a '1' (signifying that a header of a data packet with SEQN=1 was received). Accordingly, the alternating reception signifiers 'R' of the bitmap 1110 are represented differently in the bitmap 1120. In particular, the seven reception signifiers 'R' are presented as '0', '0', '1', '0', '1', '0', and '1', respectively.

The primary device 110 may use the bitmap 1110 and/or the bitmap 1120 to determine which packets should be selectively relayed to the secondary device 120. In one possible scenario, the primary device 110 may use the bitmap 1110 and/or the bitmap 1120 as a basis for comparison to a bitmap received from the secondary device 120. (It will be understood that in this scenario, the primary device 110 need not literally generate the bitmap or store it in memory, but instead may simply retain and/or acquire knowledge of previous receiving operations in any suitable manner) In another possible scenario, the primary device 110 may literally generate the bitmap 1110 and/or the bitmap 1120 and transmit the generated bitmap to the secondary device 120. The secondary device 120 may perform the analysis and request selective relay, if necessary, of missed data packets.

FIG. 12 generally illustrates a plurality of example bitmaps populated by the secondary device 120 in response to the communications depicted in FIG. 10. As will be understood from FIG. 12, the secondary device timeline 1002 is reproduced from FIG. 10 and the operations performed thereon are identical to the operations depicted in FIG. 10. For clarity, the time slot index is also shown (exactly as depicted in FIG. 10) and the timing of the packet transmission is indicated (exactly as depicted in FIG. 10).

As shown in FIG. 12, there are two example bitmaps that might be generated by the primary device 110 in the example scenario of FIG. 10. In a first example, a bitmap 1210 is a one-bit bitmap analogous to the bitmap 1110 depicted in FIG. 11. In a second example, a bitmap 1220 is a two-bit bitmap analogous to the bitmap 1120 depicted in FIG. 11. Analogous to the bitmap 1110 and the bitmap 1120, the bitmap 1210 and the bitmap 1220 include a bitmap boundary 1230 that marks an origin time slot.

The bitmap 1210 may be generated in the same manner as the bitmap 1110. The differences between the bitmap 1210 and the bitmap 1110 is that they are populated with different values based on the different conditions experienced by the secondary device 120. Similar to the primary device 110, the secondary device 120 does not effectively receive a data packet having a data packet payload in any of the time slots '2', '6', '10', '14', '18', '22', or '26'. Accordingly, these time slots are represented by seven null signifiers ('N') in the second, fourth, sixth, eight, tenth, twelfth, and fourteenth bitmap portions. Also similar to the primary device 110, the secondary device 120 does effectively receive a data packet having a data packet payload in each of the time slots '4', '8', '16', '20', and '24'. Accordingly, these time slots are represented by five receptions signifiers ('R') in the third, fifth, ninth, eleventh, and thirteenth bitmap portions. Unlike the primary device 110, the secondary device 120 fails to effectively receive a data packet having a data packet payload in time slots '0' and '12'. Accordingly, these time slot are represented by two additional null signifiers ('N') in the first and fifth bitmap portions.

The bitmap 1220 may be generated in the same manner as the bitmap 1120. In particular, for each time slot in which a data packet having a data packet payload is not effectively received, a corresponding bitmap portion will be populated with a null signifier ('N'), and for each time slot in which a data packet having a data packet payload is effectively received, a corresponding bitmap portion will be populated with a SEQN=0 signifier ('0') if the header includes SEQN=0 or a SEQN=1 signifier ('1') if the header includes SEQN=1.

As noted above, up to four states may be represented by bitmap portions of the bitmap 1220. Three of the four states are represented by signifiers 'N', '0', and '1', whereas the fourth state may be used for any suitable purposes. For example, recall from FIG. 6 that the populator of the bitmap may determine based on an attempt to decrypt the data packet if a MIC error has occurred (at 624), and may populate the bitmap with a MIC-error signifier (at 641) in response to a determination that a MIC error has occurred. As shown in the bitmap 1220, a MIC-error signifier may be represented as an 'E'. Accordingly, the four states of the two-bit bitmap 1220 may correspond to 'N', 'E', '0', and '1'.

Unlike the primary device 110 (which successfully received every data packet transmitted by the host device 130), the secondary device 120 missed two transmissions (i.e., the initial transmission of packet #21 and the only transmission of packet #23). Accordingly, the bitmap portion corresponding to time slot '0' is populated with an 'N' and the bitmap portion correspond to time slot '12' is also populated with an 'N'.

As will be discussed in greater detail below, the missing of packet #23 may have downstream effects in the form of MIC errors. For purposes of encryption, the secondary device 120 maintains a packet counter that stores a packet counter number (PCN). The PCN may be used to decrypt the data. If the data does not decrypt successfully, this may indicate one of two things: first, that the data stream from the host device 130 is under attack by a third party, or second, that the secondary device 120 has lost an accurate count of the PCN.

The secondary device 120 maintains the PCN by incrementing the packet counter every time the secondary device 120 receives a data packet with a different SEQN than the previously-received data packet. For example, suppose that the secondary device 120 has successfully received the first twenty data packets transmitted by the host device 130, numbered PCN=1 (having SEQN=0) through PCN=20 (having SEQN=1). When the secondary device 120 newly receives a header of a data packet in time slot '4', the secondary device 120 may determine that the SEQN of the newly-received data packet (SEQN=0) is different from the SEQN of the previously-received data packet #20 (SEQN=1). Because the newly-received data packet has a different SEQN, the secondary device 120 may increment the packet counter to PCN=21 and assume that the newly-received data packet is packet #21. Based on the scenario of FIGS. 10-12, this assumption may be correct. However, as will be discussed in greater detail below by reference to FIG. 12, the assumption may sometimes fail.

As noted above, the packet counter increments when the SEQN alternates. However, consider the scenario in FIG. 12, where the secondary device 120 fails to receive the header of packet #23 (having SEQN=0) in time slot '12'.

If packet #23 (having SEQN=0) had been received, then the secondary device 120 would have deduced that it was a new packet due to the fact that its SEQN differs from the previously-received data packet (i.e., packet #22). The secondary device 120 would have incremented the packet counter, and deduced that the newly-received packet was packet #23. Packet #23 would be decrypted using PCN=23 and the decryption would have succeeded.

But in the present example, packet #23 (having SEQN=0) was not received in time slot '12', so the packet counter would stay at PCN=22. Instead, the next packet received by the secondary device 120 is packet #24 (having SEQN=1) in time slot '16'. Thus when packet #24 is received by the secondary device 120, it has the same SEQN as the previously-received packet (the previously-received packet being packet #22 in this case, since packet #23 was never received). As a result, the secondary device 120 may deduce (incorrectly) that the data packet received in time slot '16' is a re-transmission of packet #22.

In some conventional approaches, a redundant re-transmission packet will simply be discarded. Accordingly, when packet #24 is mistaken for a re-transmission of packet #22 (which has already been successfully received in time slot '8'), the conventional approach may dictate that packet #24 be discarded. In accordance with aspects of the disclosure, data packets thought to be redundant may be preserved rather than discarded, as will be discussed in greater detail below.

Returning to the example scenario, the secondary device 120 may receive packet #25 (having SEQN=0) in time slot '20'. Because the SEQN of the newly-received data packet is different from the previously-received data packet (SEQN=1), the secondary device 120 may deduce that it is a new packet and increment the packet counter from PCN=22 to PCN=23. The packet #25 is in fact a new packet, but it is not the packet that the secondary device 120 is expecting. When the secondary device 120 attempts to decrypt packet #25, it will do so using PCN=23. As a result, decryption will fail, and the result will be a MIC error.

In some conventional approaches, a data packet associated with a MIC error will simply be discarded. Accordingly, when packet #25 is mistaken for packet #23, the conventional approach may dictate that packet #24 be discarded. In accordance with aspects of the disclosure, data packets associated with MIC error may be preserved rather than discarded, as will be discussed in greater detail below.

Returning to the example, the secondary device 120 may, as a result of the MIC error associated with the data packet received in time slot '20', populate the eleventh bitmap portion with a MIC-error signifier 'E'. Moreover, when packet #26 is received, it will be mistaken for packet #24, which will result in another MIC error. Accordingly, the thirteenth bitmap portion also includes the MIC-error signifier 'E'.

Figure 13:
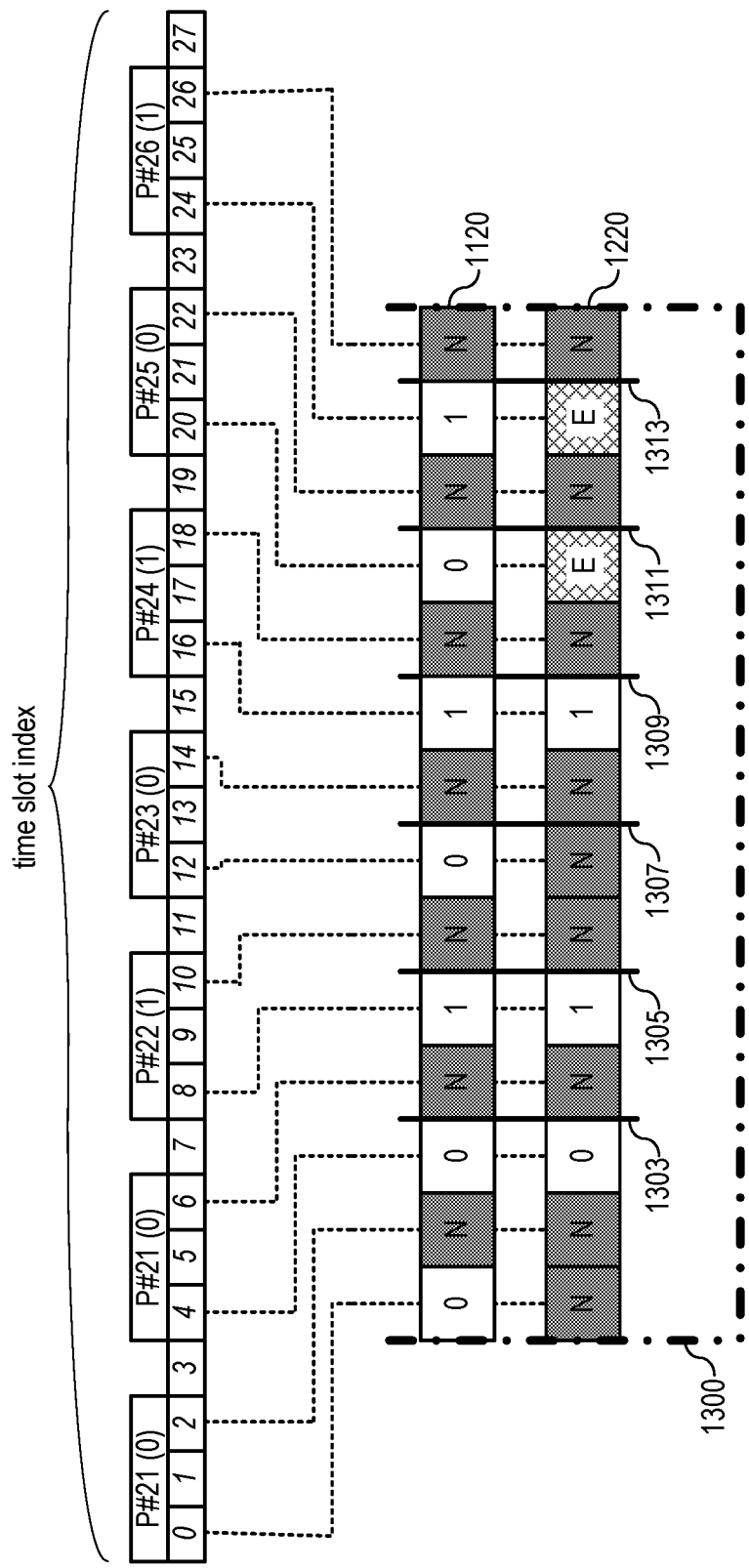
FIG. 13 generally illustrates an example side-by-side bitmap analysis of bitmaps from FIG. 11 and FIG. 12.

FIG. 13 generally illustrates an example side-by-side bitmap analysis of the bitmap 1120 depicted in FIG. 11 and the bitmap 1220 depicted in FIG. 12. The analysis may facilitate the generation of a relay list of missed data packets. As noted above, the bitmap 1120 and the bitmap 1220 are two-bit bitmaps with bitmap portions having four possible states.

For purposes of illustration, suppose that the bitmap 1220 populated by the secondary device 120 (as in FIG. 12) is transmitted to the primary device 110 for purposes of analysis. The primary device 110 may use the bitmap 1120 to compare the reception pattern experienced by the secondary device 120 (represented in the bitmap 1220) to the reception pattern experienced by the primary device 110. The primary device 110 may literally generate the bitmap 1120 (i.e., store the bitmap 1120 in memory) to perform the comparison, as shown in FIG. 13. However, it will be understood that this is for ease of illustration, and that the bitmap 1120 need not be generated as a whole or stored as a whole in the memory system. On the contrary, the reception pattern experienced by the primary device 110 may be determined or recorded in any suitable fashion.

As described above with respect to FIG. 4, the primary device 110 and the secondary device 120 may share bitmap preparation information. The bitmap preparation information may enable the respective devices to identify an origin time slot for a bitmap and a bitmap length for the bitmap. In the present example, the bitmap preparation information may facilitate the establishment of a bitmap boundary 1300. For example, the bitmap preparation information may indicate that time slot '0' is an origin time slot and a bitmap length is equal to twenty-eight time slots.

The primary device 110 may divide the bitmap 1120 into sections by establishing a series of SEQN boundaries within the bitmap boundary 1300. As will be understood from FIG. 13, the drawing of SEQN boundaries ensures that to the immediate left of every SEQN boundary is one particular SEQN signifier (for example, SEQN=0), whereas the alternate SEQN signifier is the first SEQN found to the right of the SEQN boundary. Moreover, each section of the divided bitmap (i.e., the area between SEQN boundaries) includes only one type of SEQN signifier.

To establish SEQN boundaries, the primary device 110 may begin at the origin time slot '0' and proceed forward until a SEQN is found. In this case, a SEQN=0 signifier ('0') may be found in the first bitmap portion. Having established that the first data packet associated with the bitmap has a SEQN of zero, the primary device 110 may proceed forward until it reaches a bitmap portion containing a SEQN=1. In this case, a SEQN=1 signifier may be found in the fifth bitmap portion. To establish the first SEQN boundary of the series, the primary device 110 may then proceed backward (from the SEQN=1 signifier in the fifth bitmap portion) until it once again reaches a SEQN=0 signifier. In this case, a SEQN=0 signifier may be found in the third bitmap portion. As a result, the primary device 110 may establish a SEQN boundary 1303 after the third bitmap portion.

Using a similar method, the primary device 110 may proceed through the entirety of the bitmap establishing SEQN boundaries. In particular, having established the SEQN boundary 1303 following an instance of the SEQN=0 signifier the third bitmap portion, the primary device 110 may (A) proceed forward until it finds an opposite-SEQN signifier (i.e., the SEQN=1 signifier in the fifth bitmap portion in the present example), (B) continue to proceed forward until it finds a same-SEQN signifier (i.e., the SEQN=0 signifier in the seventh bitmap portion in the present example), (C) proceed backward until it identifies the latest opposite-SEQN signifier (i.e., the SEQN=1 signifier in the fifth bitmap portion in the present example), and (D) establish a SEQN boundary 1305 immediately following the identified bitmap portion. A SEQN boundary 1307, a SEQN boundary 1309, a SEQN boundary 1311, and a SEQN boundary 1313 may be established in the same manner.

Having established a first SEQN boundary 1303 after the third bitmap portion, the primary device 110 may check a first section of the bitmap 1220 (i.e., the first three bitmap portions) for at least one matching SEQN signifier. In the present example, the third bitmap portion includes a matching SEQN signifier (in particular, a SEQN=0 signifier). Accordingly, the primary device 110 may determine that packet #21 was successfully received by the secondary device 120 and refrain from adding packet #21 to the relay list.

Having established a second SEQN boundary 1305 after the fifth bitmap portion, the primary device 110 may check a second section of the bitmap 1220 (i.e., the fourth and fifth bitmap portions) for a matching signifier. In the present example, the fifth bitmap portion of the bitmap 1220 includes at least one matching SEQN signifier (the SEQN=1 signifier in the fifth bitmap portion). Accordingly, the primary device 110 may determine that packet #22 was successfully received by the secondary device 120 and refrain from adding packet #22 to the relay list.

Having established a third SEQN boundary 1307 after the seventh bitmap portion, the primary device 110 may check a third section of the bitmap 1220 (i.e., the sixth and seventh bitmap portions) for a matching signifier. In the present example, neither the sixth nor the seventh bitmap portion of the bitmap 1220 includes a matching SEQN signifier. Accordingly, the primary device 110 may determine that packet #23 was missed by the secondary device 120 and may add packet #23 to the relay list.

The analysis of the remainder of the bitmap 1220 will reveal to the primary device 110 that packet #24 was received by the secondary device 120 but likely misinterpreted as a re-transmission of packet #22. The MIC-error signifiers in the eleventh and thirteenth bitmap portions will reveal to the primary device 110 that packet #25 and packet #26 were also received by the secondary device 120 but likely decrypted with errors due to reliance on an incorrect packet counter. The MIC errors are predictable given that once the packet counter falls behind, the packet counter will stay behind until it is corrected.

In the present example, the relay list may include packet #23 only. In accordance with aspects of the disclosure, the secondary device 120 may have preserved packet #24 (even though it has been misinterpreted as a re-transmission) as well as packet #25 and packet #26 (even though they had not been successfully decrypted). To perform the selective relay, the primary device 110 may transmit packet #23 to the secondary device 120. The primary device 110 may indicate (in the data packet or elsewhere) that the selectively relayed packet is packet #23. Additionally or alternatively, the primary device 110 may indicate (in the data packet or elsewhere) that packet #23 is the only packet and/or the last packet on the relay list.

Based on the selective relay performed by the primary device 110, the secondary device 120 may be configured to reconstruct the series of packets. Prior to selective relay, the secondary device 120 would have already successfully received and decrypted packet #21 and packet #22. Following the selective relay, the secondary device 120 may successfully receive and decrypt packet #23 using PCN=23, and increment the packet counter to PCN=24. The secondary device 120 may then retrieve the data packet received in time slots '16' through '18' and decrypt it using PCN=24. (As noted above, even though packet #24 has been presumed to be a re-transmission, it is not discarded by the secondary device 120, but rather preserved in storage). The packet counter may then be incremented to facilitate a successful re-decryption of packet #25 and packet #26. It will be understood that prior to re-decryption with a correct PCN, it may be necessary to re-encrypt the packet using the incorrect PCN that caused the MIC error. For example, the secondary device 120 may have decrypted packet #25 using PCN=23 and gotten a MIC error. In response to the MIC error, the secondary device 120 may be configured to re-encrypt the packet using the PCN that resulted in the MIC error (i.e., PCN=23). Only after the re-encryption using PCN=23 is complete will the re-decryption using PCN=25 result in an error-free decryption. It will be understood that the secondary device 120 may perform the re-encryption prior to preserving the packet associated with the MIC error in storage. Alternatively, the secondary device 120 may perform the re-encryption after the preserved packet is retrieved from storage.

It will be understood that the primary device 110 may assume that none of the data packets received by the secondary device 120 have been discarded, even if they are interpreted as re-transmissions (as packet #24) or fail to decrypt (as packet #25 and packet #26). As a result, the relay list may be constructed such that it includes only the data packets that are missed entirely by the secondary device 120, not the data packets that are merely misidentified or improperly decrypted.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted in all cases as "based at least in part on" rather than, for example, "based solely on". Moreover, the phrase "coupled to" in electrical contexts encompasses any suitable method for delivering an electrical signal from a first node to a second node. As such, "coupled to" may encompass "coupled directly to" (for example, by direct conductive connection, such as with a copper wire, a solder ball, etc.) as well as "coupled indirectly to" (for example, having one or more intervening structures therebetween, such as a switch, a buffer, a filter, etc.). It will be further understood that terms such as "top" and "bottom", "left" and "right", "vertical" and "horizontal", etc., are relative terms used strictly in relation to one another, and do not express or imply any relation with respect to gravity, a manufacturing device used to manufacture the components described herein, or to some other device to which the components described herein are coupled, mounted, etc. It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not imply that there are only two elements and further does not imply that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of non-transitory storage medium known in the art. As used herein the term "non-transitory" does not exclude any physical storage medium or memory and particularly does not exclude dynamic memory (e.g., RAM) but rather excludes only the interpretation that the medium can be construed as a transitory propagating signal. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method, comprising:
   listening to a host device in one or more listening time slots of a host piconet;
   identifying one or more bitmap portions of a bitmap, wherein the identified one or more bitmap portions corresponds to the one or more listening time slots of the host piconet;
   determining whether a data packet having a data packet payload is effectively received from the host device during the one or more listening time slots, wherein the bitmap is used to show a successful reception of the data packet; and
   populating the bitmap with one or more corresponding signifiers, wherein the populating comprises:
      populating a first bitmap portion of the one or more bitmap portions with a reception signifier and any remaining bitmap portions of the one or more bitmap portions with a null signifier in response to a determination that the data packet having the data packet payload was effectively received during the one or more listening time slots; and
      populating each of the one or more values with the null signifier in response to a determination that the data packet having the data packet payload was not effectively received during the one or more listening time slots.

2. The method of claim 1, wherein the first bitmap portion of the one or more bitmap portions corresponds to an earliest time slot of the one or more listening time slots.

3. The method of claim 1, further comprising determining that the data packet having the data packet payload is effectively received, wherein the determining comprises:
   receiving a data packet header during the one or more listening time slots, wherein the data packet header indicates whether the data packet includes the data packet payload; and
   determining that the data packet header indicates that the data packet includes the data packet payload.

4. The method of claim 3, wherein:
   the one or more bitmap portions each comprise two or more bits;
   the received data packet header indicates a sequence number of the data packet; and
   populating the first bitmap portion with the reception signifier comprises:
      populating the first bitmap portion with a sequence-number-zero reception signifier based on the indicated sequence number; or
      populating the first bitmap portion with a sequence-number-one reception signifier based on the indicated sequence number.

5. The method of claim 1, further comprising:
   receiving the data packet from the host device during the one or more listening time slots of the host piconet;
   maintaining a packet counter to determine a packet counter number value associated with the data packet;
   decrypting the data packet using the packet counter; and
   determining whether the decrypting passes a message integrity check.

6. The method of claim 5, wherein populating the first bitmap portion further comprises:
   populating the first bitmap portion with a message-integrity-check-error signifier in response to a determination that the decrypting did not pass the message integrity check.

7. The method of claim 1, further comprising populating the bitmap with additional information, wherein the additional information comprises:
   slot count information indicating a maximum number of slots over which the data packet might be received;
   packet type information indicating a type of the data packet;
   retransmission information indicating whether the data packet is a new data packet or a retransmitted data packet; or
   any combination thereof.

8. The method of claim 1, wherein the one or more listening slots comprise:
   one listening slot;
   two consecutive listening slots, each consecutive listening slot separated from a previous or next listening slot by a transmitting slot; or
   three consecutive listening slots, each consecutive listening slot separated from a previous or next listening slot by a transmitting slot.

9. The method of claim 1, further comprising:
   selecting a plurality of bitmap portions that includes the one or more bitmap portions, wherein the plurality of bitmap portions respectively corresponds to a plurality of time slots that includes the one or more listening time slots, and the plurality of bitmap portions constitute the bitmap;
   generating bitmap preparation information, wherein the generating comprises:
      identifying a bitmap origin slot marking the beginning or the end of the bitmap, wherein the bitmap origin slot is associated with a particular packet counter number, a particular sequence number, a particular clock value of the host piconet, and/or a particular clock value of a piconet; and
      identifying a bitmap length, wherein the bitmap length comprises a number of time slots and/or a number of bitmap portions in the bitmap; and
   transmitting the bitmap preparation information to another device over a primary/secondary piconet, wherein the bitmap preparation information comprises the identified bitmap origin time slot and the identified bitmap length.

10. The method of claim 1, further comprising:
    receiving bitmap preparation information from another device over a primary/secondary piconet;

identifying, based on the bitmap preparation information, a plurality of time slots and/or bitmap portions corresponding to the bitmap, wherein the identifying comprises:
identifying a bitmap origin slot marking the beginning or the end of the bitmap, wherein the bitmap origin slot is associated with a particular packet counter number, a particular sequence number, a particular clock value of the host piconet, and/or a particular clock value of the primary/secondary piconet; and
identifying a bitmap length, wherein the bitmap length comprises a number of time slots and/or a number of bitmap portions in the bitmap; and
identifying the plurality of time slots and/or bitmap portions constituting the bitmap based on the identified bitmap origin time slot and identified bitmap length.

11. An apparatus comprising a transceiver system configured to listen to a host device in one or more listening time slots of a host piconet, a memory system configured to store data, instructions, or a combination thereof, and a processing system coupled to the transceiver system and the memory system, wherein the processing system is configured to:
identify one or more bitmap portions of a bitmap, wherein the identified one or more bitmap portions corresponds to the one or more listening time slots of the host piconet;
determine whether a data packet having a data packet payload is effectively received from the host device during the one or more listening time slots, wherein the bitmap is used to show a successful reception of the data packet; and
populate the bitmap with one or more corresponding signifiers, wherein to populate the bitmap, the processing system is further configured to:
populate a first bitmap portion of the one or more bitmap portions with a reception signifier and any remaining bitmap portions of the one or more bitmap portions with a null signifier in response to a determination that the data packet having the data packet payload was effectively received during the one or more listening time slots; and
populate each of the one or more values with the null signifier in response to a determination that the data packet having the data packet payload was not effectively received during the one or more listening time slots.

12. The apparatus of claim 11, wherein the first bitmap portion of the one or more bitmap portions corresponds to an earliest time slot of the one or more listening time slots.

13. The apparatus of claim 11, further comprising determining that the data packet having the data packet payload is effectively received, wherein the determining comprises:
receiving a data packet header during the one or more listening time slots, wherein the data packet header indicates whether the data packet includes the data packet payload; and
determining that the data packet header indicates that the data packet includes the data packet payload.

14. The apparatus of claim 13, wherein:
the one or more bitmap portions each comprise two or more bits;
the received data packet header indicates a sequence number of the data packet; and
to populate the bitmap, the processing system is further configured to:
populate the first bitmap portion with a sequence-number-zero reception signifier based on the indicated sequence number; or
populate the first bitmap portion with a sequence-number-one reception signifier based on the indicated sequence number.

15. The apparatus of claim 11, wherein the processing system is further configured to:
receive the data packet from the host device during the one or more listening time slots of the host piconet;
maintain a packet counter to determine a packet counter number value associated with the data packet;
decrypt the data packet using the packet counter; and
determine whether the decrypting passes a message integrity check.

16. The apparatus of claim 15, wherein to populate the bitmap, the processing system is further configured to:
populate the first bitmap portion with a message-integrity-check-error signifier in response to a determination that the decrypting did not pass the message integrity check.

17. The apparatus of claim 11, wherein to populate the bitmap, the processing system is further configured to populate the bitmap with additional information, wherein the additional information comprises:
slot count information indicating a maximum number of slots over which the data packet might be received;
packet type information indicating a type of the data packet;
retransmission information indicating whether the data packet is a new data packet or a retransmitted data packet; or
any combination thereof.

18. The apparatus of claim 11, wherein the one or more listening slots comprise:
one listening slot;
two consecutive listening slots, each consecutive listening slot separated from a previous or next listening slot by a transmitting slot; or
three consecutive listening slots, each consecutive listening slot separated from a previous or next listening slot by a transmitting slot.

19. The apparatus of claim 11, wherein the processing system is further configured to:
select a plurality of bitmap portions that includes the one or more bitmap portions, wherein the plurality of bitmap portions respectively corresponds to a plurality of time slots that includes the one or more listening time slots, and the plurality of bitmap portions constitute the bitmap;
generate bitmap preparation information, wherein to generate the bitmap preparation information, the processing system is further configured to: identify a bitmap origin slot marking the beginning or the end of the bitmap, wherein the bitmap origin slot is associated with a particular packet counter number, a particular sequence number, a particular clock value of the host piconet, and/or a particular clock value of a piconet; and
identify a bitmap length, wherein the bitmap length comprises a number of time slots and/or a number of bitmap portions in the bitmap; and
transmit the bitmap preparation information to another device over a primary/secondary piconet, wherein the bitmap preparation information comprises the identified bitmap origin time slot and the identified bitmap length.

20. The apparatus of claim 11, wherein the processing system is further configured to:
receive bitmap preparation information from another device over a primary/secondary piconet;
identify, based on the bitmap preparation information, a plurality of time slots and/or bitmap portions corresponding to the bitmap, wherein to identify the bitmap preparation information, the processing system is further configured to:
identify a bitmap origin slot marking the beginning or the end of the bitmap, wherein the bitmap origin slot is associated with a particular packet counter number, a particular sequence number, a particular clock value of the host piconet, and/or a particular clock value of the primary/secondary piconet; and
identify a bitmap length, wherein the bitmap length comprises a number of time slots and/or a number of bitmap portions in the bitmap; and
identify the plurality of time slots and/or bitmap portions constituting the bitmap based on the identified bitmap origin time slot and identified bitmap length.

21. An apparatus, comprising:
means for listening to a host device in one or more listening time slots of a host piconet;
means for identifying one or more bitmap portions of a bitmap, wherein the identified one or more bitmap portions corresponds to the one or more listening time slots of the host piconet;
means for determining whether a data packet having a data packet payload is effectively received from the host device during the one or more listening time slots, wherein the bitmap is used to show a successful reception of the data packet; and
means for populating the bitmap with one or more corresponding signifiers, wherein the means for populating comprises:
means for populating a first bitmap portion of the one or more bitmap portions with a reception signifier and any remaining bitmap portions of the one or more bitmap portions with a null signifier in response to a determination that the data packet having the data packet payload was effectively received during the one or more listening time slots; and
means for populating each of the one or more values with the null signifier in response to a determination that the data packet having the data packet payload was not effectively received during the one or more listening time slots.

22. The apparatus of claim 21, wherein the first bitmap portion of the one or more bitmap portions corresponds to an earliest time slot of the one or more listening time slots.

23. The apparatus of claim 21, further comprising means for determining that the data packet having the data packet payload is effectively received, wherein the means for determining comprises:
means for receiving a data packet header during the one or more listening time slots, wherein the data packet header indicates whether the data packet includes the data packet payload; and
means for determining that the data packet header indicates that the data packet includes the data packet payload.

24. The apparatus of claim 23, wherein:
the one or more bitmap portions each comprise two or more bits;
the received data packet header indicates a sequence number of the data packet; and
means for populating the first bitmap portion with the reception signifier comprises:
means for populating the first bitmap portion with a sequence-number-zero reception signifier based on the indicated sequence number; or
means for populating the first bitmap portion with a sequence-number-one reception signifier based on the indicated sequence number.

25. The apparatus of claim 21, further comprising:
means for receiving the data packet from the host device during the one or more listening time slots of the host piconet;
means for maintaining a packet counter to determine a packet counter number value associated with the data packet;
means for decrypting the data packet using the packet counter; and
means for determining whether the decrypting passes a message integrity check;
wherein the means for populating the first bitmap portion further comprises means for populating the first bitmap portion with a message-integrity-check-error signifier in response to a determination that the decrypting did not pass the message integrity check.

26. A non-transitory computer-readable medium comprising at least one instruction for causing a processor to perform operations, comprising:
code for listening to a host device in one or more listening time slots of a host piconet;
code for identifying one or more bitmap portions of a bitmap, wherein the identified one or more bitmap portions corresponds to the one or more listening time slots of the host piconet;
code for determining whether a data packet having a data packet payload is effectively received from the host device during the one or more listening time slots, wherein the bitmap is used to show a successful reception of the data packet; and
code for populating the bitmap with one or more corresponding signifiers, wherein the code for populating comprises:
code for populating a first bitmap portion of the one or more bitmap portions with a reception signifier and any remaining bitmap portions of the one or more bitmap portions with a null signifier in response to a determination that the data packet having the data packet payload was effectively received during the one or more listening time slots; and
code for populating each of the one or more values with the null signifier in response to a determination that the data packet having the data packet payload was not effectively received during the one or more listening time slots.

27. The non-transitory computer-readable medium of claim 26, wherein the first bitmap portion of the one or more bitmap portions corresponds to an earliest time slot of the one or more listening time slots.

28. The non-transitory computer-readable medium of claim 26, further comprising code for determining that the data packet having the data packet payload is effectively received, wherein the code for determining comprises:
code for receiving a data packet header during the one or more listening time slots, wherein the data packet header indicates whether the data packet includes the data packet payload; and code for determining that the data packet header indicates that the data packet includes the data packet payload.

29. The non-transitory computer-readable medium of claim 28, wherein:
the one or more bitmap portions each comprise two or more bits;
the received data packet header indicates a sequence number of the data packet; and
code for populating the first bitmap portion with the reception signifier comprises:
code for populating the first bitmap portion with a sequence-number-zero reception signifier based on the indicated sequence number; or
code for populating the first bitmap portion with a sequence-number-one reception signifier based on the indicated sequence number.

30. The non-transitory computer-readable medium of claim 26, further comprising:
code for receiving the data packet from the host device during the one or more listening time slots of the host piconet;
code for maintaining a packet counter to determine a packet counter number value associated with the data packet;
code for decrypting the data packet using the packet counter; and
code for determining whether the decrypting passes a message integrity check;
wherein the code for populating the first bitmap portion further comprises code for populating the first bitmap portion with a message-integrity-check-error signifier in response to a determination that the decrypting did not pass the message integrity check.

* * * * *